(12) United States Patent
Moon et al.

(10) Patent No.: US 10,785,773 B2
(45) Date of Patent: Sep. 22, 2020

(54) SCHEDULING METHOD AND APPARATUS

(71) Applicant: ELECTRONICS AND TELECOMMUNICATIONS RESEARCH INSTITUTE, Daejeon (KR)

(72) Inventors: Sung-Hyun Moon, Daejeon (KR); Cheulsoon Kim, Daejeon (KR); Ji Hyung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/089,575

(22) PCT Filed: Mar. 28, 2017

(86) PCT No.: PCT/KR2017/003318
§ 371 (c)(1),
(2) Date: Sep. 28, 2018

(87) PCT Pub. No.: WO2017/171351
PCT Pub. Date: Oct. 5, 2017

(65) Prior Publication Data
US 2019/0116592 A1  Apr. 18, 2019

(30) Foreign Application Priority Data

Mar. 29, 2016  (KR) .................. 10-2016-0037968
Sep. 8, 2016  (KR) .................. 10-2016-0115870
(Continued)

(51) Int. Cl.
H04W 72/04  (2009.01)
H04W 74/08  (2009.01)
(Continued)

(52) U.S. Cl.
CPC ........... H04W 72/0453 (2013.01); H04L 5/00 (2013.01); H04W 72/042 (2013.01);
(Continued)

(58) Field of Classification Search
CPC .......... H04W 72/0453; H04W 72/042; H04W 74/0833; H04W 84/042; H04W 88/08;
(Continued)

(56) References Cited

U.S. PATENT DOCUMENTS

2014/0211740 A1* 7/2014 Berggren .............. H04L 5/0048
370/329
2015/0188650 A1  7/2015 Au et al.
(Continued)

FOREIGN PATENT DOCUMENTS

EP  2816858 A1  12/2014

OTHER PUBLICATIONS

Huawei, Hisilicon "Short TTI for DL transmissions", 3GPP TSG RAN WG1 Meeting #84, R1-160292, St Julian's, Malta, Feb. 2016.
(Continued)

Primary Examiner — Hardikkumar D Patel
(74) Attorney, Agent, or Firm — LRK Patent Law Firm

(57) ABSTRACT

Within one carrier, a base station reserves a first resource area for a first TTI-based transmission in a unit of first TTI within a second TTI period longer than the first TTI, and schedules a first data channel to be transmitted on the basis of the first TTI, in the first resource area.

15 Claims, 20 Drawing Sheets

(30) Foreign Application Priority Data

| Nov. 15, 2016 | (KR) | ........................ | 10-2016-0151988 |
| Jan. 9, 2017 | (KR) | ........................ | 10-2017-0003129 |
| Mar. 27, 2017 | (KR) | ........................ | 10-2017-0038750 |

(51) Int. Cl.
*H04L 5/00* (2006.01)
*H04W 84/04* (2009.01)
*H04W 88/08* (2009.01)

(52) U.S. Cl.
CPC ...... *H04W 74/0833* (2013.01); *H04W 84/042* (2013.01); *H04W 88/08* (2013.01)

(58) Field of Classification Search
CPC . H04W 72/04; H04W 24/10; H04W 72/0486; H04W 40/16; H04W 72/0446; H04W 72/1231; H04W 24/08; H04W 4/023; H04W 72/1226; H04W 4/029; H04W 52/04; H04W 52/243; H04W 4/02; H04W 64/006; H04W 28/0236; H04W 16/28; H04L 5/00; H04L 25/06; H04L 5/0073
See application file for complete search history.

(56) References Cited

U.S. PATENT DOCUMENTS

| 2015/0351093 | A1 | 12/2015 | Au et al. |
| 2016/0135182 | A1 | 5/2016 | Jung et al. |
| 2016/0143008 | A1 | 5/2016 | Lee et al. |
| 2017/0238344 | A1* | 8/2017 | McGowan ............ H04L 5/0007 370/329 |
| 2018/0063820 | A1* | 3/2018 | Xiong ................. H04W 72/042 |
| 2018/0255586 | A1* | 9/2018 | Einhaus ............ H04W 72/0413 |
| 2019/0044782 | A1* | 2/2019 | Zeng ................... H04L 27/2613 |

OTHER PUBLICATIONS

Ericsson, "Overview of TTI shortening and reduced processing time for DL transmissions", 3GPP TSG RAN WG1 Meeting #84, R1-160929, Malta, Feb. 2016.
Motorola Mobility, "Using shortened DL TTI for reduced latency data transmission", 3GPP TSG RAN WG1 #84, R1-160971, St. Julian's, Malta, Feb. 2016.
ZTE, "Downlink control channels for short TTI", 3GPP TSG RAN WG1 Meeting #84, R1-160983, St Julian's, Malta, Feb. 2016.
Search Report, dated Jun. 23, 2017, for International Application No. PCT/KR2017/003318.
Written Opinion, dated Jun. 23, 2017, for International Application No. PCT/KR2017/003318.
Huawei, Hisilicon, "Channel Raster Design", 3GPP TSG RAN WG1 Meeting #84, R1-160313, St Julian's, Malta, Feb. 15-19, 2016.
Intel Corporation, "Operation mode indication and channel raster for NB-IoT", 3GPP TSG RAN WG1 Meeting #84, R1-160408, St Julian's, Malta, Feb. 15-19, 2016.
MCC Support, "Draft Report of 3GPP TSG RAN WG1 #84 v0.2.0", 3GPP TSG RAN WG1 Meeting #84bis R1-16xxxx, Busan, South Korea, Apr. 11-15, 2016.

* cited by examiner

SCHEDULING METHOD AND APPARATUS

CROSS-REFERENCE TO RELATED APPLICATIONS

The present application is a U.S. National Phase entry from International Application No. PCT/KR2017/003318, filed Mar. 28, 2017, which claims priority to Korean Patent Application Nos. 10-2016-0037968, filed Mar. 29, 2016, 10-2016-0115870, filed Sep. 8, 2016, 10-2016-0151988, filed Nov. 15, 2016, 10-2017-0003129, filed Jan. 9, 2017, and 10-2017-0038750, filed Mar. 27, 2017, the disclosures of which are incorporated by reference herein in their entireties.

BACKGROUND

1. Technical Field

The present invention relates a scheduling method and apparatus.

2. Description of Related Art

A wireless communication system supports a frame structure according to the standard. For example, the 3GPP long term evolution (LTE) system supports three frame structure types. The first type is a frame structure type 1 applicable to a frequency division duplex (FDD), the second type is a frame structure type 2 applicable to a time division duplex (TDD), and the last type is a frame structure type 3 for transmission in an unlicensed band.

In frame structure type 1, one radio frame has a length of 10 ms and includes 10 subframes. One subframe includes two slots with a length of 0.5 ms. One slot includes seven orthogonal frequency division multiplexing (OFDM) symbols for a normal cyclic prefix (CP) or six OFDM symbols for an extended CP. Differently from type 1, a radio frame of frame structure type 2 includes 10 subframes consisting of a downlink subframe, an uplink subframe, and a special subframe.

In the wireless communication system such as the LTE system, a transmission time interval (TTI) is defined as a basic time unit during which an encoded data packet is transmitted through a physical layer signal. As the wireless communication systems evolve, it is required to support traffic having various requirements. For example, the wireless communication system may be required to simultaneously support enhanced mobile broadband (eMBB) traffic requiring high transmission speed and ultra-reliable low latency communication (URLLC) traffic requiring short transmission latency. The TTI lengths for satisfying different requirements may have different values. For example, the TTI for satisfying the short transmission latency of the URLLC traffic may be set shorter than the TTI for satisfying the high transmission rate of the eMBB traffic. Therefore, the wireless communication system needs to support transmissions of TTI units having different lengths within one carrier in order to efficiently support traffic having various requirements.

SUMMARY

The present invention provides a scheduling method and apparatus for supporting transmissions of TTI units having different lengths within one carrier.

According to one embodiment of the present invention, a scheduling method of a base station is provided. The scheduling method includes reserving a first resource region for a first transmission time interval (TTI) based transmission in unit of first TTI within a second TTI interval within one carrier, the second TTI being longer than the first TTI, and scheduling a first data channel for the first TTI-based transmission on the first resource region.

The scheduling method may further include scheduling a second data channel for a second TTI-based transmission on a region other than the first resource region within the second TTI interval within the carrier.

The scheduling method may further include reserving the first resource region among a plurality of resource regions divided in the unit of first TTI within the second TTI interval and transmitting information indicating the first resource region among the plurality of resource regions to a terminal.

The information indicating the resource region may be transmitted through a control region within the second TTI interval.

The scheduling method may further include scheduling on the first resource region additional data for a second data channel that is scheduled as the second TTI-based transmission.

The scheduling method may further include transmitting, through a control region, information indicating that the first resource region is used for a transmission of the additional data.

The scheduling method may further include transmitting information indicating a time region of the first resource region to a terminal through a physical layer signaling and transmitting information indicating a frequency region of the first resource region to the terminal through a higher layer signaling.

The scheduling method may further include transmitting information indicating the first resource region to a terminal through a combination of a physical layer signaling and a higher layer signaling.

Scheduling the first data channel may include semi-persistently scheduling the first data channel on the first resource region.

The scheduling method may further include, when another radio access technology (RAT) carrier coexist within the carrier, indicating a terminal to apply an offset of a predetermined number of subcarriers to the first resource region.

The scheduling method may further include, when another RAT carrier coexist within the carrier, allocating a guard band around said another RAT carrier in the first resource region.

According to another embodiment of the present invention, a scheduling method of a terminal is provided. The scheduling method may include receiving from a base station a scheduling of a first data channel to be transmitted based on a first TTI on a first resource region wherein the first resource region is reserved for the first TTI-based transmission in unit of first TTI within a second TTI interval within one carrier and the second TTI is longer than the first TTI, and receiving or transmitting the first data channel on the first resource region.

The scheduling method may further include receiving a scheduling of a second data channel to be transmitted based on the second TTI on a region other than the first resource region within the second TTI interval within the carrier.

The scheduling method may further include receiving from the base station information indicating the first resource region among a plurality of resource regions divided in the unit of first TTI within the second TTI interval.

The information indicating the resource region may be transmitted through a control region within the second TTI interval.

The scheduling method may further include receiving a scheduling of additional data for a second data channel that is scheduled as the second TTI-based transmission, the additional data being scheduled on the first resource region.

The scheduling method may further include receiving, through a control region, information indicating that the first resource region is used for a transmission of the additional data.

The scheduling method may further include receiving information indicating a time region of the first resource region from the base station through a physical layer signaling and receiving information indicating a frequency region of the first resource region from the base station through a higher layer signaling.

The scheduling method may further include receiving information indicating the first resource region from the base station through a combination of a physical layer signaling and a higher layer signaling.

According to yet another embodiment of the present invention, a scheduling apparatus including a processor and a transceiver is provided. The processor reserves a resource region for a first TTI based transmission in unit of first TTI within a second TTI interval within one carrier wherein the second TTI is longer than the first TTI, and schedules a data channel for the first TTI-based transmission on the resource region. The transceiver transmits or receives the data channel on the resource region.

According to still another embodiment of the present invention, a scheduling apparatus including a processor and a transceiver is provided. The processor receives from a base station a scheduling of a first data channel to be transmitted based on a first TTI on a first resource region wherein the first resource region is reserved for the first TTI-based transmission in unit of first TTI within a second TTI interval within one carrier and the second TTI is longer than the first TTI. The transceiver receives or transmits the first data channel on the first resource region.

Advantageous Effects

According to an embodiment of the present invention, transmissions of TTI units having different lengths within one carrier can be supported.

DETAILED DESCRIPTION OF THE INVENTION

Figure 1:
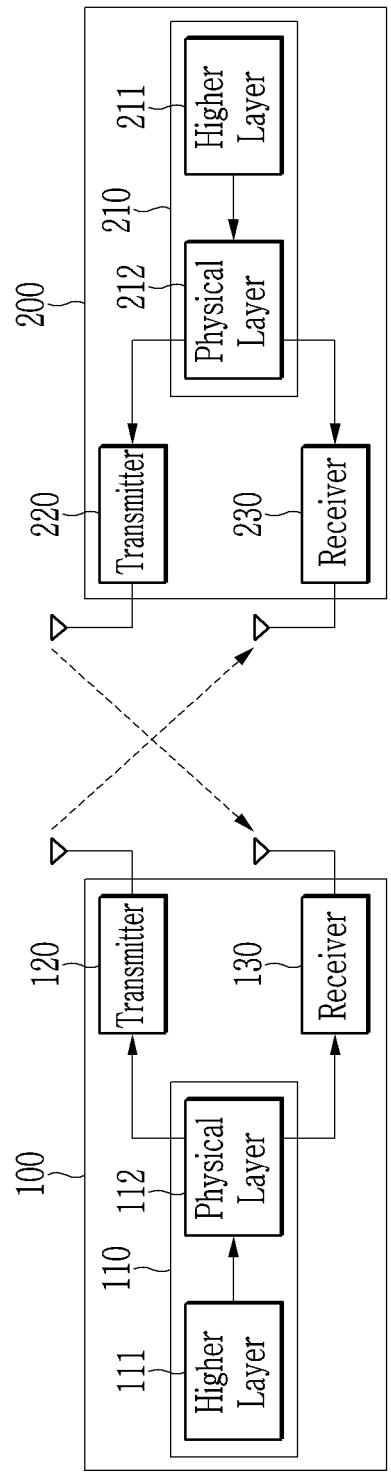
FIG. 1 is a schematic diagram of a wireless communication system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a term "terminal" may designate a user equipment (UE), a mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and so on, or may include all or some functions thereof.

Further, a term "base station" (BS) may designate a node B, an evolved node B (eNB), a gNB, an advanced base station (ABS), a high reliability base station (HR-BS), an access point (AP), a radio access station (RAS), a base transceiver station (BTS), an mobile multihop relay (MMR) BS, a relay station (RS) functioning as the BS, a relay node (RN) functioning as the BS, an advance relay station (ARS) functioning as the BS a high reliability relay station (HR-RS) functioning as the BS, a small BS [e.g., a femto BS, a home node B (HNB), a home eNB (HeNB), a pico BS, a macro BS, a micro BS], and so on, or may include all or some functions thereof.

A term described in the singular may be interpreted as singular or plural unless an explicit term such as "one" or "single" is used.

A wireless communication system according to an embodiment of the present invention is applicable to various wireless communication networks. For example, the wireless communication system may be applied to a wireless communication network based on a current radio access technology (RAT) or 5G or next generation wireless communication network. The 3GPP is developing a new RAT-based 5G standard satisfying IMT-2020 requirements, and such a new RAT is called NR (New Radio). For convenience, the NR-based wireless communication system is exemplified in an embodiment of the present invention. However, an embodiment of the present invention is not limited thereto and may be applied to various wireless communication systems.

Compared with the existing 3GPP system such as a code division multiple access (CDMA) or LTE system, one of different features of the NR is that the NR utilizes a wide range of frequency bands to increase transmission capacity. Orthogonal frequency division multiplexing (OFDM), filtered OFDM, generalized frequency division multiplexing (GFDM), and filter bank multi-carrier (FBMC) are discussed as candidate waveform technologies for the NR. For convenience, cyclic prefix based OFDM (CP-OFDM) is exemplified in an embodiment of the present invention. However, an embodiment of the present invention is not limited thereto and various waveform techniques may be used. On the other hand, the CP-OFDM technique may include windowed and/or filtered CP-OFDM or spread spectrum OFDM (e.g., DFT-spread OFDM) technique.

Table 1 shows an example of an OFDM system parameter configuration for the NR system. A frequency band, for example, a frequency band of 700 MHz to 100 GHz of the NR system may be classified into a low frequency band (e.g., below 6 GHz), a high frequency band (e.g., 3 to 40 GHz), and a very high frequency band (e.g., 30 to 100 GHz), and different OFDM parameters may be applied to the frequency bands. The OFDM parameter includes a subcarrier spacing, a CP length, and an OFDM symbol length, and may further include a system bandwidth, a sampling rate, a fast Fourier transform (FFT) size, and the like. One of the biggest factors determining the subcarrier spacing of the OFDM is a carrier frequency offset (CFO) experienced at a receiver side. The CFO has a characteristic that it increases in proportion to an operating frequency due to the Doppler effect and a phase drift. Therefore, the subcarrier spacing should increase in proportion to the operating frequency in order to prevent performance degradation due to the CFO. However, if the subcarrier spacing is too large, a CP overhead increases. Therefore, the subcarrier spacing should be defined as an appropriate value considering channel and RF characteristics for each frequency band. The subcarrier spacings of parameter sets A, B, and C shown in Table 1 are 16.875 kHz, 67.5 kHz, and 270 kHz, respectively, and are configured to be proportional to target operating frequencies and to be approximately 4 times as large as the other one. Table 2 shows numerologies of LTE unicast, that is, an example configuring six OFDM numerologies by making the subcarrier spacing of 15 kHz as a basic numerology and increasing the subcarrier spacing by double, 4 times, 8 times, 16 times, and 32 times, respectively.

TABLE 1

|  | Set A | Set B | Set C |
| --- | --- | --- | --- |
| Carrier frequency | Low freq. (~6 GHz) | High freq. (3-40 GHz) | Very high freq. (30-100 GHz) |
| Subcarrier spacing | 16.875 kHz | 67.5 kHz | 270 kHz |
| CP overhead | 5.2% | 5.2% | 5.2% |
| Number of OFDM symbols per 1 ms | 16 | 64 | 256 |

TABLE 2

|  | Set A | Set B | Set C | Set D | Set E | Set F |
| --- | --- | --- | --- | --- | --- | --- |
| Subcarrier spacing | 15 kHz | 30 kHz | 60 kHz | 120 kHz | 240 kHz | 480 kHz |
| CP overhead | 6.7% | 6.7% | 6.7% | 6.7% | 6.7% | 6.7% |
| Number of OFDM symbols per 1 ms | 14 | 28 | 56 | 112 | 224 | 448 |

One numerology may be basically used for one cell or carrier and may be used for a specific time-frequency resource within one carrier. Heterogeneous numerologies may be used for different operating frequency bands and may be used to support different types of services in the same frequency band and/or the same carrier. As an example of the latter, set A of Table 2 may be used for an enhanced Mobile Broadband (eMBB) service in a band below 6 GHz, and sets B or C may be used for an ultra-reliable low latency communication (URLLC) service in the band below 6 GHz. To support a massive machine-type communication (mMTC) or a multimedia broadcast multicast service (MBMS), a numerology having the narrower subcarrier spacing than the basic numerology may be used. For this, the subcarrier spacing of 7.5 kHz or 3.75 kHz may be considered when the subcarrier spacing of the basic numerology is 15 kHz.

A user plane latency requested by the NR is 4 ms for the eMBB requiring a high transmission rate and 0.5 ms for the URLLC requiring a short transmission latency. The user plane latency is a unidirectional transmission latency required for successfully transmitting an IP (internet protocol) packet. The user plane latency is based on a path from an SDU (service data unit) entrance in layer 2/3 of a wireless protocol in one node of a base station and a terminal to an SDU exit in layer 2/3 of the wireless protocol in the other node.

When designing a frame structure supporting the eMBB and the URLLC, it is important to define a transmission time interval (TTI) length to satisfy such latency requirements. The TTI means a basic time unit during which an encoded data packet is transmitted through a physical layer signal. For a given TTI length, the user plane latency may be roughly estimated. For example, when the transmission or reception signal processing latencies of the base station and the terminal are computed as 1.5 TTI, respectively an average latency for a frame alignment is computed as 0.5 TTI, a wireless transmission latency is computed as 1 TTI, and an average latency for a retransmission is computed as 0.8 TTI, a total user plane latency is 5.3 TTI. In this case, although it is assumed that the latencies required for the transmission/reception signal processing and the retransmission in the base station and the terminal are proportional to the TTI length, some components (e.g., FFT/IFFT and MIMO transmission/reception operation) may be not proportional to the TTI length and require a certain amount of processing time. According to the above criteria, the user plane latencies for TTI lengths of 1 ms, 0.5 ms, 0.25 ms, 0.125 ms, and 0.0625 ms are 5.3 ms, 2.65 ms, 1.325 ms, 0.6625 ms, and 0.33125 ms, respectively. Among the TTI length candidates, the longest TTI length (L_eMBB) satisfying 4 ms which is the eMBB requirement is 0.5 ms and the longest TTI length (L_URLLC) satisfying 0.5 ms which is the URLLC requirement is 0.0625 ms. However, if the user plane latency can be shortened compared with this example, the TTI length (L_eMBB) for the eMBB may be as much as 1 ms.

Table 3 shows examples of slot lengths and TTI lengths for the OFDM parameter sets exemplified in Table 1. It is assumed that the slot length is always fixed to 16 OFDM symbols irrespective of the numerologies. Accordingly, the slot lengths for the numerologies set A, B and C are 1 ms, 0.25 ms and 0.0625 ms, respectively. If the slot length is defined as L_S, the TTI lengths for the eMBB and URLLC may be defined as, for example, min(L_eMBB, L_S) and min(L_URLLC, L_S), respectively. It is assumed in the examples of Table 3 that L_eMBB is 1 ms and L_URLLC is 0.0625 ms. According to the above definition, for the numerology set A, the TTI length L_eMBB for the eMBB is min(1 ms, 1 ms)=1 ms and the TTI length L_URLLC for the URLLC is min(0.0625 ms, 1 ms)=0.0625 ms since the slot length L_S is 1 ms. For the numerology set C, the TTI length L_eMBB for the eMBB is min(1 ms, 0.0625 ms)=0.0625 ms and the TTI length L_URLLC for the URLLC is min(0.0625 ms, 0.0625 ms)=0.0625 ms since the slot length L_S is 0.0625 ms. A scheme of defining the TTI length may be applied to cases (e.g., an mMTC transmission) other than the eMBB and URLLC transmissions.

TABLE 3

|  | Set A | Set B | Set C |
| --- | --- | --- | --- |
| Slot length | 1 ms (16 symbols) | 0.25 ms (16 symbols) | 0.0625 ms (16 symbols) |
| TTI length | eMBB: 1 ms (16 symbols) URLLC: 0.0625 ms (1 symbol) | eMBB: 0.25 ms (16 symbols) URLLC: 0.0625 ms (4 symbols) | eMBB: 0.0625 ms (16 symbols) URLLC: 0.0625 ms (16 symbols) |

In an embodiment of the present invention, a slot and a sub-slot are used as a minimum time unit for scheduling in a wireless communication system. The slot may be used as a time unit longer than the sub-slot. For a given numerology, the slot may be composed of a greater number of OFDM symbols than the sub-slot. For example, the slot may be composed of 14 OFDM symbols and the sub-slot may be a smaller number of OFDM symbols (e.g., two OFDM symbols). In this case, assuming that the subcarrier spacing is 15 kHz, the slot corresponds to 1 ms and the subslot corresponds to 1/7 ms. Considering a communication for an unlicensed band, the sub-slot may be defined so that the sub-slot length is scalable or starting points of the sub-slot are various (for example, all the OFDM symbols constituting the slot). A slot-based scheduling may be defined as a default scheme of a terminal in an RRC (radio resource control) connected state, and a sub-slot based scheduling may be defined to be applicable only to terminals that are configured with the sub-slot based scheduling.

In some embodiments, a scheduling method of aggregating a plurality of slots or a plurality of sub-slots may be used. This method is referred to as a multi-slot or multi-sub-slot scheduling. In this case, the plurality of slots or the plurality of sub-slots may be temporally continuous or discontinuous, but an example of using the former is assumed unless otherwise specified.

Two types of TTIs are defined in an embodiment of the present invention. One is a normal TTI (hereinafter referred to as "nTTI") and the other is a short TTI (hereinafter referred to as "sTTI"). The sTTI is shorter than the nTTI. In some embodiments, the nTTI and the sTTI may be used for transmissions with different requirements. For example, the nTTI and the sTTI may be used for eMBB and URLLC transmissions, respectively.

In some embodiments, when the same subcarrier spacing is used for the nTTI and the sTTI, a slot and a sub-slot may be used as the nTTI and the sTTI, respectively (hereinafter referred to as "usage example 1"). It may be effective to use the same CP overhead value for the nTTI and the sTTI. The examples shown in Table 3 may correspond to this example. For example, in a subcarrier spacing of 16.875 kHz, when the slot and the sub-slot are composed of 16 OFDM symbols and one OFDM symbol, respectively, lengths of the nTTI and the sTTI are 1 ms and 0.0625 ms, respectively.

In some embodiments, the multi-slot scheduling may be used for the nTTI and the sTTI. For example, the nTTI may include a plurality of slots and the sTTI may include one slot. The multi-slot scheduling is used for an nTTI transmission and a single slot scheduling may be used for an sTTI transmission (hereinafter referred to as "usage example 2).

In some embodiments, different subcarrier spacings may be used for the nTTI and the sTTI. For example, the subcarrier spacings of 15 kHz and 60 kHz may be used for the nTTI and the sTTI, respectively. In this case, the nTTI and the sTTI may be composed of a slot (hereinafter referred to as "usage example 3"). Assuming that the slot includes 14 OFDM symbols in the above example, the lengths of nTTI and sTTI are 1 ms and 0.25 ms, respectively, due to the difference in the subcarrier spacings. Assuming that one includes 7 OFDM symbols, the length of the TTI is halved. The same CP overhead ratio may be applied to the nTTI and the sTTI, or different CP overhead ratios may be applied to the nTTI and the sTTI. For example, the LTE normal CP overhead may be applied to the nTTI and the LTE extended CP overhead may be applied to the sTTI.

In an embodiment of the present invention, an nTTI and an sTTI coexist within one carrier to efficiently support traffic having various requirements (for example, eMBB and URLLC) simultaneously. That is, an nTTI-based transmission and an sTTI-based transmission coexist. In an embodiment of the present invention, the carrier may be used in the same meaning as in the LTE system. The carriers may also support multiple numerologies or support a wider system bandwidth than the LTE. In some embodiments, a plurality of sTTIs having different lengths within one carrier may be set at the same time. In some embodiments, for coexistence within one carrier, the nTTI length may be an integer multiple of the sTTI length regardless of the sTTI length.

There may be a terminal supporting only a part of usage examples 1 to 3 according to a terminal capability. For example, a terminal that supports a slot but does not support a sub-slot cannot use usage example 1 for the URLLC transmission. The use of usage example 3 may be restricted to a terminal supporting only a specific numerology. When a plurality of downlink packets or a plurality of uplink packets are not allowed to be scheduled simultaneously from the viewpoint of one terminal, the nTTI and the sTTI may be scheduled on different time resources.

In an embodiment of the present invention, a downlink physical data channel and an uplink physical data channel are referred to as a PDSCH (physical downlink shared channel) and a PUSCH (physical uplink shared channel), respectively, as in the LTE system. A downlink physical control channel and an uplink physical control channel are referred to as a PDCCH (physical downlink control channel) and a PUCCH (physical uplink control channel), respectively. An nTTI-based PDSCH and an nTTI-based PUSCH are referred to as an nPDSCH and an nPUSCH, respectively. An sTTI-based PDSCH and an sTTI-based PUSCH are referred to as an sPDSCH and an sPUSCH, respectively. An nTTI-based PDCCH and an nTTI-based PUCCH are referred to as an nPDCCH and an nPUCCH, respectively. An sTTI-based PDCCH and an sTTI-based PDCCH are referred to as an sPDCCH and an sPUCCH, respectively.

In this case, the nPDSCH and sPDSCH may not be distinguished from each other and the nPDCCH and sPDCCH may not be distinguished from each other, depending on a method of configuring the nTTI and sTTI. For example, when usage example 2 or 3 is used for configuring the nTTI and sTTI, the same data channel may be used for the nPDSCH and sPDSCH and the same control channel may be used for the nPDCCH and sPDCCH since both a basic unit configuring both the nTTI and the sTTI is the slot. This is the same in a case of the uplink channel.

Now, a data transmitting or receiving method in a wireless communication system according to an embodiment of the present invention is described with reference to the drawings.

FIG. 1 is a schematic diagram of a wireless communication system according to an embodiment of the present invention.

Referring to FIG. 1, a wireless communication system includes a plurality of base stations 100 and a plurality of terminals 200.

The base station 100 transmits a downlink data channel and a control channel indicating a resource region through which the corresponding downlink data channel is transmitted. The terminal 200 receives the control channel to identify the resource region, receives the downlink data channel on the corresponding resource region, and decodes data transmitted by the base station 100. The terminal 200 transmits an uplink data channel, and the base station 100 receives the uplink data channel and decodes data transmitted by the terminal 200. In this case, the terminal can identify a resource region through which the uplink data channel is transmitted based on the control channel received from the base station 100.

The base station 100 includes a processor 110 and a transceiver, and the transceiver includes a transmitter 120 and a receiver 130. Each of the processor 110, the transmitter 120, and the receiver 130 may be formed of physical hardware. The transmitter 120 and the receiver 130 may be formed of one piece of hardware (e.g., a chip). All of the processor 110, transmitter 120, and receiver 130 may be formed of one piece of hardware (e.g., a chip).

The processor 110 implements a higher layer 111 and a physical layer 112, and may execute commands necessary for operations of the base station 100 and control operations of the transmitter 120 and the receiver 130. The transmitter 120 transmits a signal transferred from the physical layer 112 to the terminal 200 through an antenna, and the receiver 130 receives a signal from the terminal 200 through the antenna and transfers the signal to the physical layer 112. The transmitter 120 and the receiver 130 may exchange signals with other base stations 100.

Similarly, the terminal 200 includes a processor 210 and a transceiver, and the transceiver includes a transmitter 220 and a receiver 230. Each of the processor 210, the transmitter 220, or the receiver 230 may each be formed of physical hardware. The transmitter 220 and the receiver 230 may be formed of one piece of hardware (e.g., a chip). All of the processor 210, the transmitter 220, and the receiver 230 may be formed of one piece of hardware (e.g., a chip).

The processor 210 implements the higher layer 211 and the physical layer 212, and may execute commands necessary for operations of the terminal 200 and control operations of the transmitter 220 and the receiver 230. The transmitter 220 transmits a signal transferred from the physical layer 212 to the base station 100 through an antenna, and the receiver 230 receives a signal from the terminal 100 through the antenna and transfers the signal to the physical layer 212. The transmitter 220 and the receiver 230 may exchange signals with other terminals 200.

Figure 2:
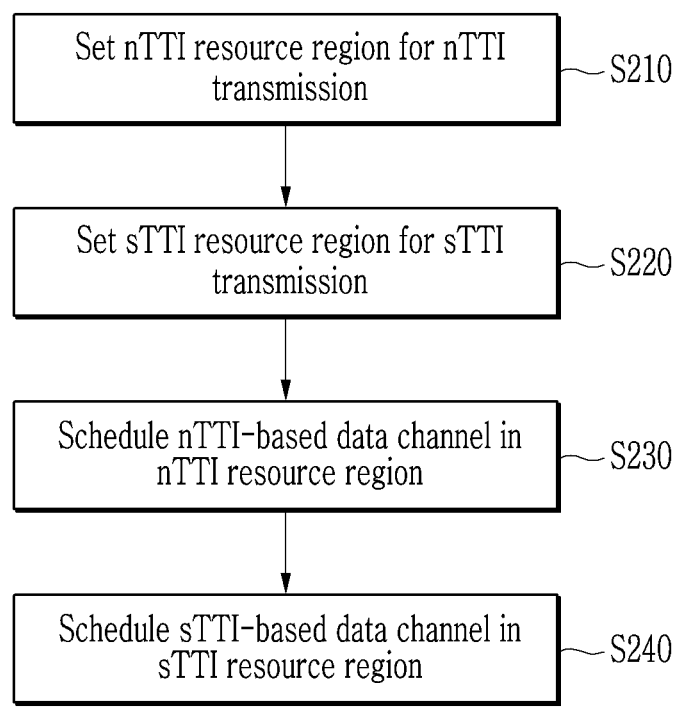
FIG. 2 is a flowchart showing a scheduling method in a wireless communication system according to an embodiment of the present invention.

FIG. 2 is a flowchart showing a scheduling method in a wireless communication system according to an embodiment of the present invention.

Referring to FIG. 2, a base station sets an nTTI resource region for an nTTI transmission and an sTTI resource region for an sTTI transmission within one carrier (S210, S220). In order for the nTTI transmission and the sTTI transmission to coexist within one carrier, the base station may set the resource region for the nTTI transmission and the resource region for the sTTI transmission in a time division multiplexing (TDM) scheme, a frequency division multiplexing (FDM) scheme, or a resource overlapping scheme.

The base station schedules a data channel to be transmitted based on the nTTI in the nTTI resource region (S230), and schedules a data channel to be transmitted based on the sTTI in the sTTI resource area (S240).

The steps S210 to S240 may be performed in the order shown in FIG. 2, and at least some steps may be performed simultaneously or in a different order.

Now, a method of coexisting an nTTI transmission and an sTTI transmission within one carrier in a wireless communication system according to an embodiment of the present invention is described with reference to the drawings. Hereinafter, a downlink nTTI transmission (e.g., an nPDSCH) and a downlink sTTI transmission (e.g., an sPDSCH) are described as examples for convenience. However, an embodiment of the present invention can be applied to an uplink nTTI transmission and an uplink sTTI transmission in the same manner.

In some embodiments, a TDM scheme in which the nPDSCH and the sPDSCH occupy different time slots may be used. In this case, a unit of time slot may be the nTTI or the sTTI. Hereinafter, a TDM scheme in which the unit of time slot is the nTTI is referred to as an "nTTI-based TDM scheme", and a TDM system in which the unit of time slot is the sTTI is referred to as an "sTTI-based TDM scheme". The TDM scheme has an advantage that the nPDSCH and the sPDSCH can be scheduled in a wide bandwidth, but the nTTI-based TDM scheme has a disadvantage that transmission latency may be increased. In particular, if much nTTI traffic exists and the nTTI length is greatly different from the sTTI length, the sPDSCH transmission latency may be greatly increased such that it may be difficult to satisfy latency requirements.

Next, an FDM scheme for coexistence of an nPDSCH and an sPDSCH in a wireless communication system according to an embodiment of the present invention is described with reference to FIG. 3 to FIG. 5.

Figure 3:
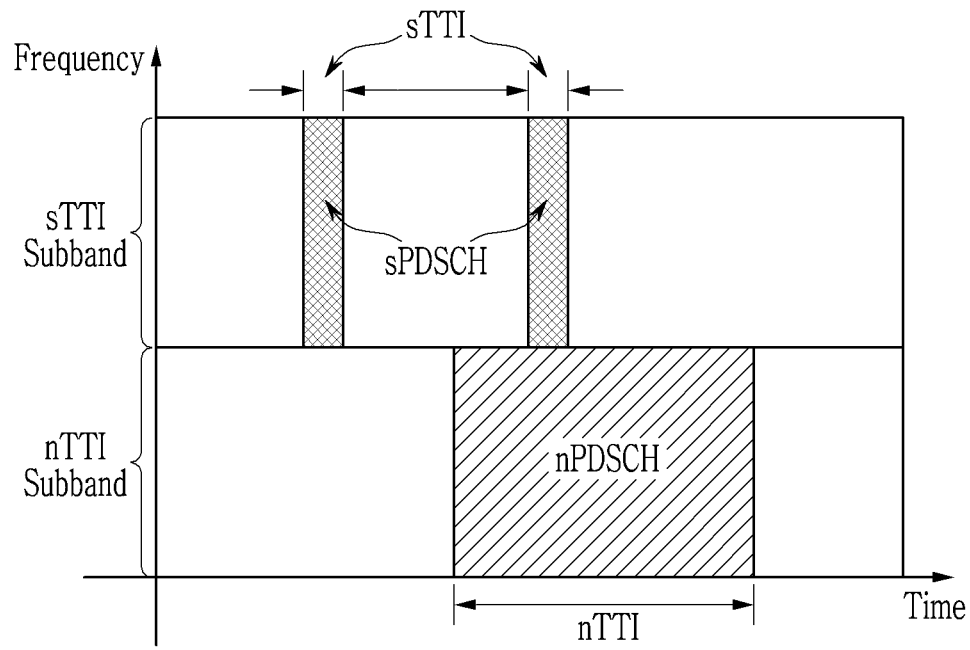
FIG. 3, FIG. 4, and FIG. 5 each show an FDM scheme for coexistence of an nPDSCH and an sPDSCH in a scheduling method according to an embodiment of the present invention.
Figure 4:
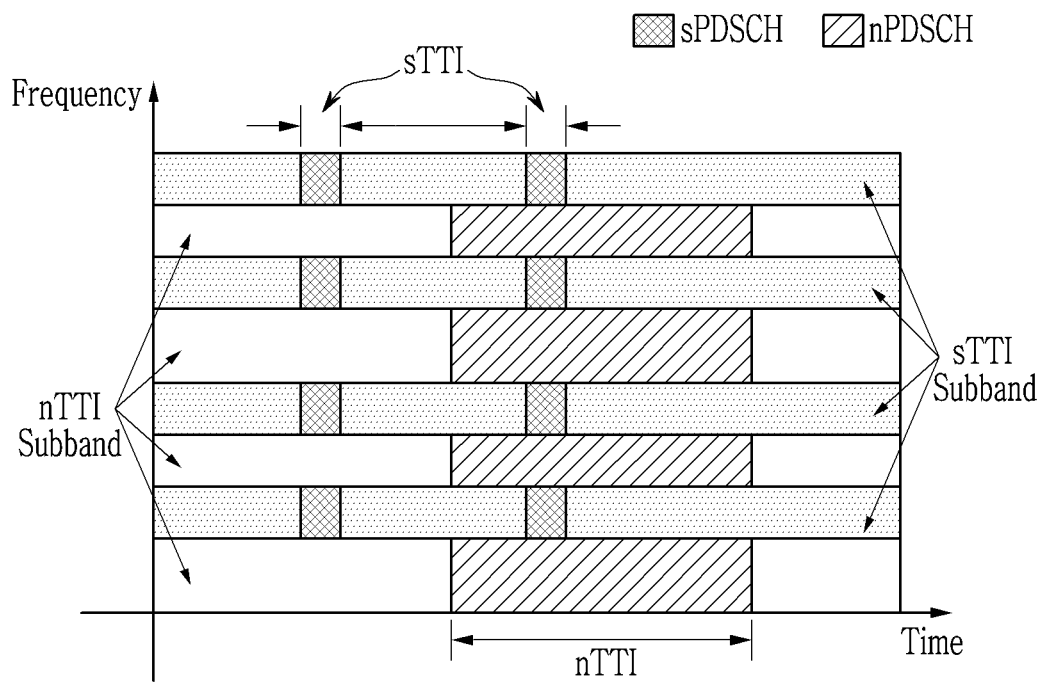
Figure 5:
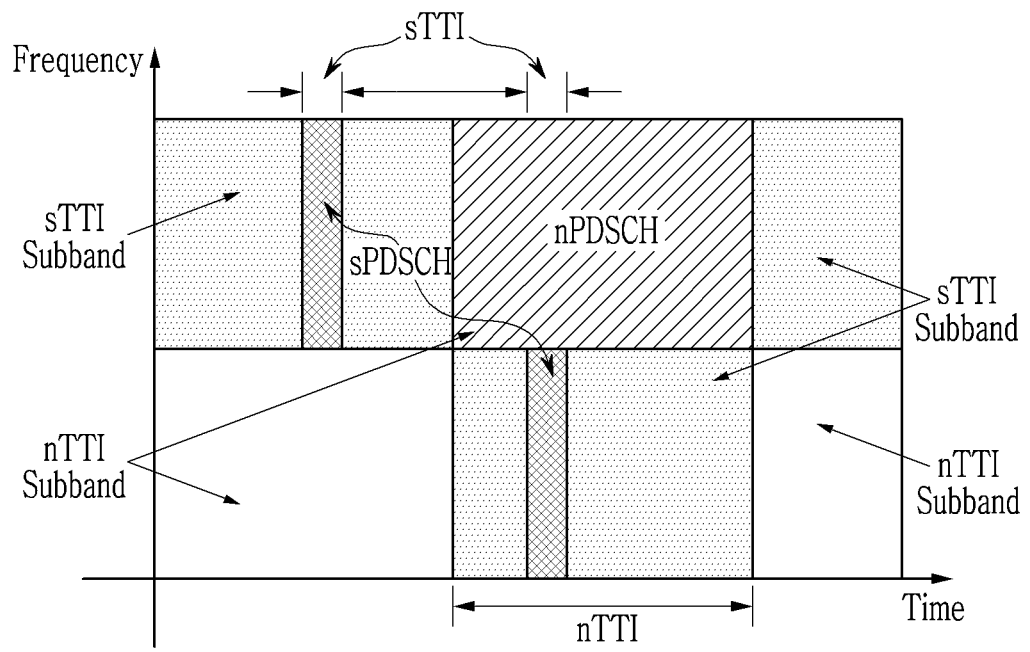

FIG. 3, FIG. 4, and FIG. 5 each show an FDM scheme for coexistence of an nPDSCH and an sPDSCH in a scheduling method according to an embodiment of the present invention.

Referring to FIG. 3, FIG. 4, and FIG. 5, in some embodiments, an FDM scheme in which an nPDSCH and an sPDSCH occupy different frequency resources may be used. For example, the nPDSCH and the sPDSCH may be transmitted through different subbands within one carrier. In other words, a subband corresponding to a resource region (hereinafter referred to as an "nPDSCH resource region") for an nPDSCH transmission may be different from a subband corresponding to a resource region (hereinafter referred to as an "sPDSCH resource region") for an sPDSCH transmission. A base station may set the sPDSCH resource region to a terminal. The terminal may expect to be scheduled the sPDSCH in a frequency band of the resource region set by the base station and to be scheduled the nPDSCH in the other frequency band. Alternatively, the base station may set the nPDSCH resource region to the terminal. Then, the terminal may expect to be scheduled the nPDSCH in the frequency resource region set by the base station and to be scheduled the sPDSCH in the other frequency band. Alternatively, the base station may set both the sPDSCH resource region and the nPDSCH resource region to the terminal.

In some embodiments, as shown in FIG. 3, a set of adjacent subcarriers, that is, a set of consecutive subcarriers may be set as the sPDSCH resource region.

In another embodiment, in order to obtain a frequency diversity gain, a set of discontinuous subcarriers or discontinuous resource blocks may be set as an sPDSCH resource region and an sPDSCH may be scheduled in a discontinuous frequency resource region, as shown in FIG. 4. A resource block may be a set of consecutive subcarriers on a frequency axis. In this case, the sPDSCH resource region may be set over an entire system bandwidth in order to maximize the frequency diversity gain. For example, assuming that a minimum unit for configuring the sPDSCH resource region is a subband, the subband may be defined as a set of selective frequency resource blocks. Specifically, if a resource block index is defined as k (k=0, 1, 2 . . . ) when a carrier is divided into S subbands, subband s (s=0, 1 . . . S−1) may be defined as a set of resource blocks k satisfying mod (k, S)=s. Here, mod (a, b) is an operation that returns a remainder obtained by dividing "a" by "b".

In yet another embodiment, an sPDSCH resource region may be time-fixed, or may be time-varying as shown in FIG. 5. The time-varying FDM scheme may be a scheme of combining the FDM scheme described with reference to FIG. 3 or FIG. 4 with the TDM scheme. The scheme of combining the FDM scheme described with reference to FIG. 3 with the TDM scheme is shown in FIG. 5.

Referring to FIG. 5, the sPDSCH resource region may be allocated to different frequency resources over time. The base station may signal the sPDSCH resource region to the terminal. Alternatively, frequency axis hopping patterns of the sPDSCH resource region may be defined in advance between the base station and the terminal, and the base station may signal one or more patterns among the hopping patterns to the terminal.

Since the FDM scheme described with reference to FIG. 3 to FIG. 5 reserves the sPDSCH resource region in advance, the utilization efficiency of the sPDSCH resource region may be deteriorated when sTTI traffic is little and sporadically occurs. Further, when the bandwidth of the sTTI subband is not sufficiently wide, the number of maximum resource elements that one sPDSCH can have may be limited so that it may be difficult to perform reliable transmission.

Next, a resource overlapping scheme for coexistence of an nPDSCH and an sPDSCH in a wireless communication system according to an embodiment of the present invention is described with reference to FIG. 6 to FIG. 9.

Figure 6:
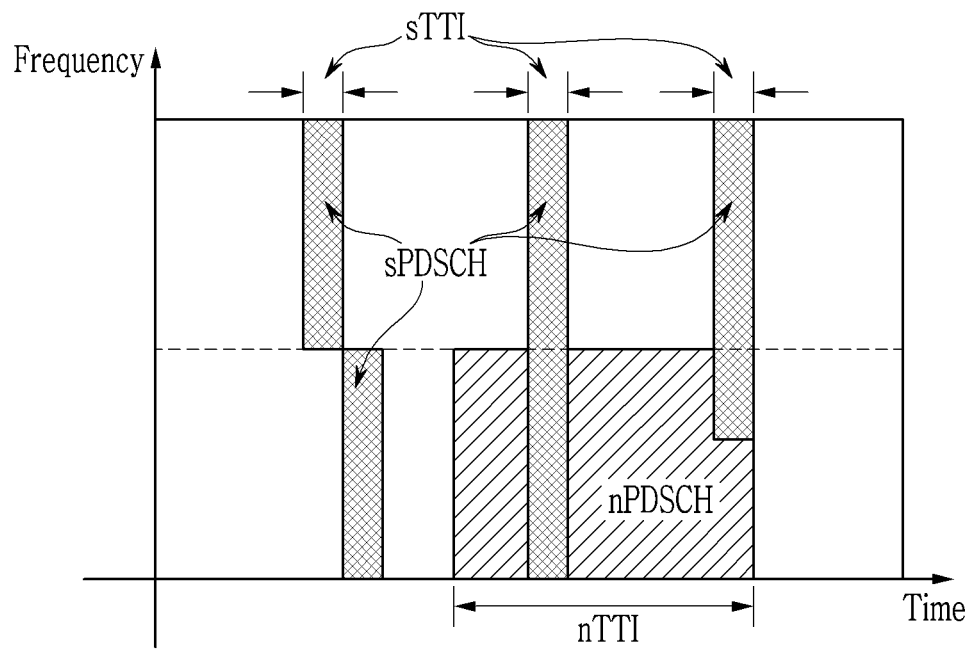
FIG. 6 shows a resource overlapping scheme for coexistence of an nPDSCH and an sPDSCH in a scheduling method according to an embodiment of the present invention.

FIG. 6 shows a resource overlapping scheme for coexistence of an nPDSCH and an sPDSCH in a scheduling method according to an embodiment of the present invention.

Referring to FIG. 6, in yet another embodiment, a resource overlapping scheme in which an nPDSCH resource region and an sPDSCH resource region can overlap with each other may be used. The resource overlapping scheme is a scheme of allowing a scheduled nPDSCH resource region to be invaded by an sPDSCH resource region to be scheduled later. FIG. 6 shows a case where the scheduled nPDSCH resource region is overlapped by two sPDSCH resource regions. An sPDSCH may invade an entire resource on which the nPDSCH is scheduled or may invade only a part of the frequency resource.

As such, the resource overlapping scheme does not need to previously distinguish the nPDSCH resource region and the sPDSCH resource region by the TDM scheme or the FDM scheme, and can integrate and employ resources for the nTTI and the sTTI. Therefore, the resources can be efficiently used compared with the FDM scheme. Further, since the sPDSCH may be transmitted by using a wide bandwidth regardless of whether the nPDSCH is scheduled in advance, the reliable sTTI transmission can be supported.

In some embodiments, if the base station knows information for scheduling an sPDSCH within an nTTI interval at the time of scheduling an nPDSCH, the base station may schedule the nPDSCH on the remaining resource region except for a resource region on which the sPDSCH is to be scheduled. In FIG. 6, if scheduling information for two sPDSCHs overlapped with the nPDSCH resource region is known at the time of scheduling the nPDSCH, the nPDSCH may be rate-matched to the remaining resource elements except for the sPDSCH resource region.

However, the base station may not know the information for scheduling the sPDSCH within the nTTI interval at the time of scheduling the nPDSCH. For example, downlink URLLC traffic or an HARQ ACK/NACK feedback to a transmission in an sTTI interval may occur during an nPDSCH transmission. As such, when the resource region of the scheduled nPDSCH is invaded by the sPDSCH to be scheduled later, puncturing, rate matching, and superposition transmission schemes may be used for the nPDSCH transmission. Hereinafter, such embodiments are described with reference to FIG. 7 to FIG. 9.

Figure 7:
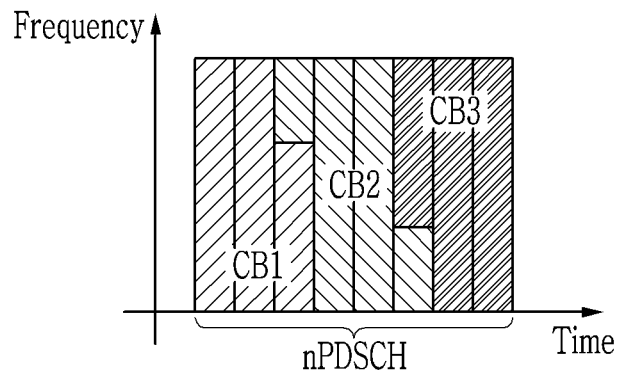
FIG. 7 shows a case where an sPDSCH does not overlap with a resource region of an nPDSCH in an nTTI interval.
Figure 8:
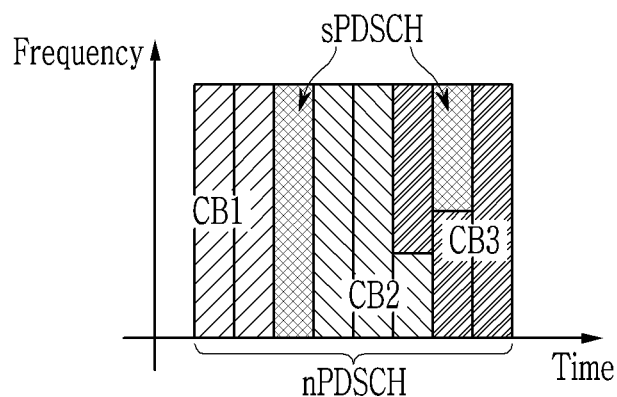
FIG. 8 shows a puncturing scheme when an sPDSCH overlaps with a resource region of an nPDSCH in an nTTI interval.
Figure 9:
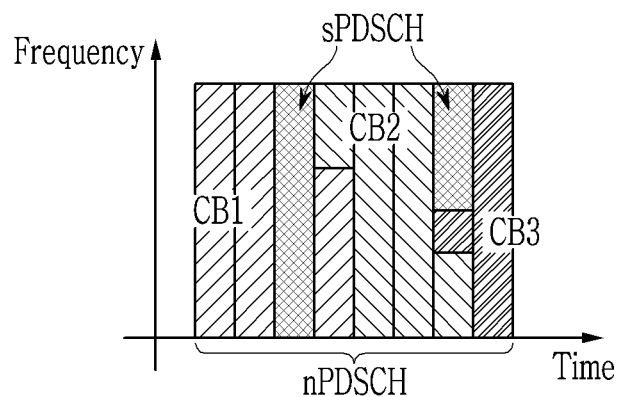
FIG. 9 shows a rate matching scheme when an sPDSCH overlaps with a resource region of an nPDSCH in an nTTI interval.

FIG. 7 shows a case where an sPDSCH does not overlap with a resource region of an nPDSCH in an nTTI interval, FIG. 8 shows a puncturing scheme when an sPDSCH overlaps with a resource region of an nPDSCH in an nTTI interval, and FIG. 9 shows a rate matching scheme when an sPDSCH overlaps with a resource region of an nPDSCH in an nTTI interval.

FIG. 7 to FIG. 9 show an example where an nTTI to which an nPDSCH is allocated includes eight OFDM symbols and the nPDSCH is encoded into three code blocks CB1, CB2, and CB3. However, the number of OFDM symbols per nTTI and the number of code blocks per nTTI are not limited thereto. The code block is a unit to which encoding or decoding of channel coding is applied. When a size of data to be transmitted through one TTI, that is, a transport block is large, the encoding and decoding are performed by dividing the transport block into a plurality of code blocks CB1, CB2, and CB3 such that the channel coding implementation complexity can be lowered.

When an sPDSCH does not overlap with a resource region of an nPDSCH, three code blocks CB1, CB2 and CB3, for example, may be successively arranged in the nPDSCH resource region as shown in FIG. 7.

In one embodiment, when the sPDSCH overlaps with the nPDSCH resource region, a puncturing scheme may be used as shown in FIG. 8. FIG. 8 shows an example where the sPDSCH overlaps with an entire region on which the code blocks CB1 and CB2 of the nPDSCH are scheduled in the third OFDM symbol and the sPDSCH overlaps with a part of a region on which the code block CB3 of the nPDSCH is scheduled in the seventh OFDM symbol. In the puncturing scheme, the originally-scheduled nPDSCH data may not be transmitted on the resource region invaded by the sPDSCH and may be transmitted on the uninvaded resource region without being changed.

In another embodiment, when the sPDSCH overlaps with the resource region of the nPDSCH, a rate matching scheme may be used as shown in FIG. 9. In the rate matching scheme, the originally-scheduled nPDSCH data on the resource region invaded by the sPDSCH, that is, a part of the code blocks CB1 and CB2 allocated to the third OFDM symbol and a part of the code block CB3 allocated to the seventh OFDM symbol may be transmitted through the remaining uninvaded resource region. Accordingly, a resource mapping of the remaining uninvaded resource region may be changed. For example, in an example shown in FIG. 9, the nPDSCH data scheduled on the third OFDM symbol may be transmitted through the fourth OFDM symbol. The nPDSCH data scheduled after the third OFDM symbol may be sequentially pushed back in the time axis, and be remapped and transmitted from the fifth OFDM symbol. Further, the nPDSCH data scheduled on the seventh OFDM symbol may be pushed back in the time axis and be transmitted through the eighth OFDM symbol or not be transmitted.

In the puncturing scheme, since the resource mapping for the remaining resource region that is not invaded by the sPDSCH is not changed, a certain level of nPDSCH reception performance can be expected even if the terminal to which the nPDSCH is scheduled does not know the resource region invaded by the sPDSCH. However, in the rate matching scheme, since the resource mapping for the remaining resource region that is not invaded by the sPDSCH may be changed, a certain level of nPDSCH reception performance can be expected when the terminal to which the nPDSCH is scheduled knows the resource region invaded by the sPDSCH. Even in the puncturing scheme, the nPDSCH reception performance can be improved if the terminal knows the resource region invaded by the sPDSCH. In some embodiments, the base station may inform the terminal to which the nPDSCH is scheduled of information on the resource region invaded by the sPDSCH through an sPDCCH. The terminal can know the information on the resource region invaded by the sPDSCH by decoding the sPDCCH to receive control information. Alternatively, the terminal may sense energy of an sPDCCH, thereby knowing whether the sPDSCH is scheduled in an sTTI interval in which the sPDCCH is transmitted. That is, when the energy of the sPDCCH is detected in the sTTI interval, the terminal can know that the sPDSCH is scheduled in the sTTI interval.

In yet another embodiment, when the sPDSCH overlaps with the resource region of the nPDSCH, a superposition transmission scheme may be used as shown in FIG. 6. The superposition transmission scheme is a method of transmitting both nPDSCH data and sPDSCH data by superposing the PDSCH and sPDSCH data on a resource region where the nPDSCH and the sPDSCH overlap. In some embodiments, a hierarchical modulation scheme may be applied to the nPDSCH and sPDSCH transmission for the superposition of the nPDSCH and the sPDSCH. The hierarchical modulation scheme is also called non-orthogonal multiple access (NOMA). In the superposition transmission scheme, even if a terminal to which the nPDSCH is scheduled does not know the information on the sPDSCH superposition, the terminal can be relatively less influenced to receive the nPDSCH. However, when optimum beamforming or precoding is different for the nPDSCH and the sPDSCH, performance may be deteriorated due to the superposition transmission of the nPDSCH and sPDSCH.

Figure 10:
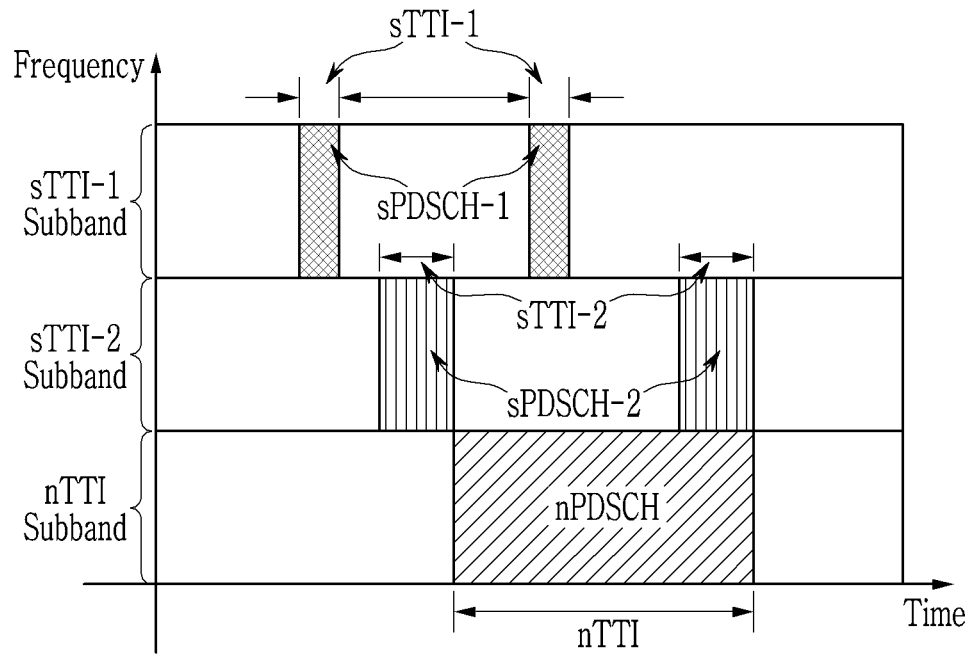
FIG. 10, FIG. 11, FIG. 12, and FIG. 13 each show a coexistence scheme of sTTI transmissions having different lengths in a scheduling method according to an embodiment of the present invention.
Figure 11:
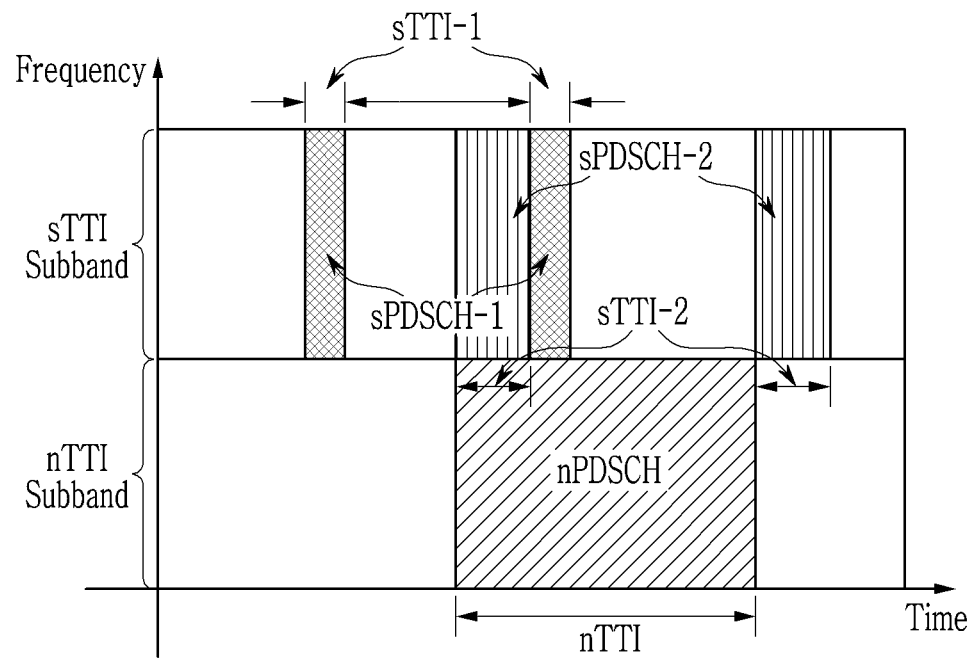

FIG. 10 and FIG. 11 each show a coexistence scheme of sTTI transmissions having different lengths in a scheduling method according to an embodiment of the present invention.

In some embodiments, as shown in FIG. 10 and FIG. 11, a plurality of sTTIs having different lengths or a plurality of corresponding sPDSCHs may coexist within one carrier. Hereinafter, in the two sTTIs having the different lengths, an sTTI having a shorter length is referred to as an sTTI-1 and an sTTI having a longer length is referred to as an sTTI-2. An sPDSCH corresponding to the sTTI-1 and an sPDSCH corresponding to sTTI-2 are referred to as sPDSCH-1 and sPDSCH-2, respectively.

In one embodiment, as shown in FIG. 10, resource regions of the sPDSCH-1 and sPDSCH-2 may be distinguished by an FDM scheme. For example, the resource regions of the sPDSCH-1 and sPDSCH-2 may be set to different subbands. In another embodiment, as shown in FIG. 11, the resource regions of the sPDSCH-1 and sPDSCH-2 may be distinguished by a TDM scheme. For example, the resource regions of the sPDSCH-1 and sPDSCH-2 may share the same subband and may be allocated to different time slots within the subband.

In a method described with reference to FIG. 10 and FIG. 11, the FDM scheme described with reference to FIG. 3 to FIG. 5 may be applied between the nTTI and the sTTI. FIG. 10 and FIG. 11 show an example where the FDM scheme shown in FIG. 3 is applied.

In another embodiment, it may be allowed that the resource regions of the sPDSCH-1 and sPDSCH-2 share the same subband and overlap with each other within the shared subband. That is, the resource overlapping scheme described with reference to FIG. 6 to FIG. 9 may be applied to the resource regions of the sPDSCH-1 and sPDSCH-2. In this case, the FDM scheme described with reference to FIG. 3 to FIG. 5 may be applied between the nTTI and the sTTI, and the resource overlapping scheme may be applied between the sTTIs. Alternatively, the resource overlapping scheme may be also applied between the nTTI and the sTTI. Hereinafter, an example where the resource overlapping scheme is applied between the nTTI and the sTTI is described with reference to FIG. 12 and FIG. 13.

Figure 12:
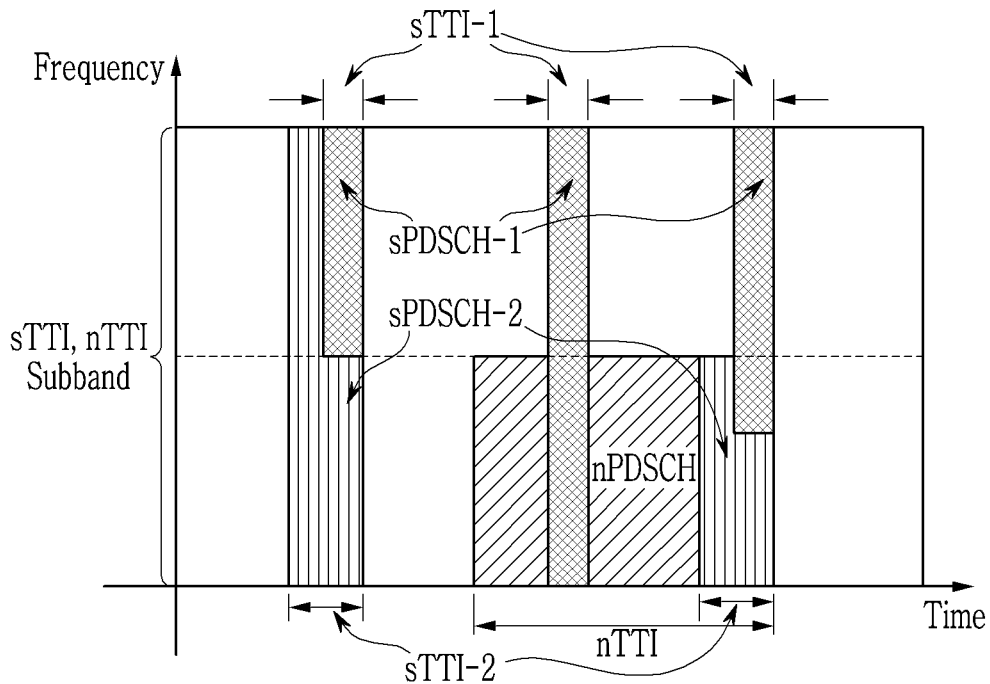
Figure 13:
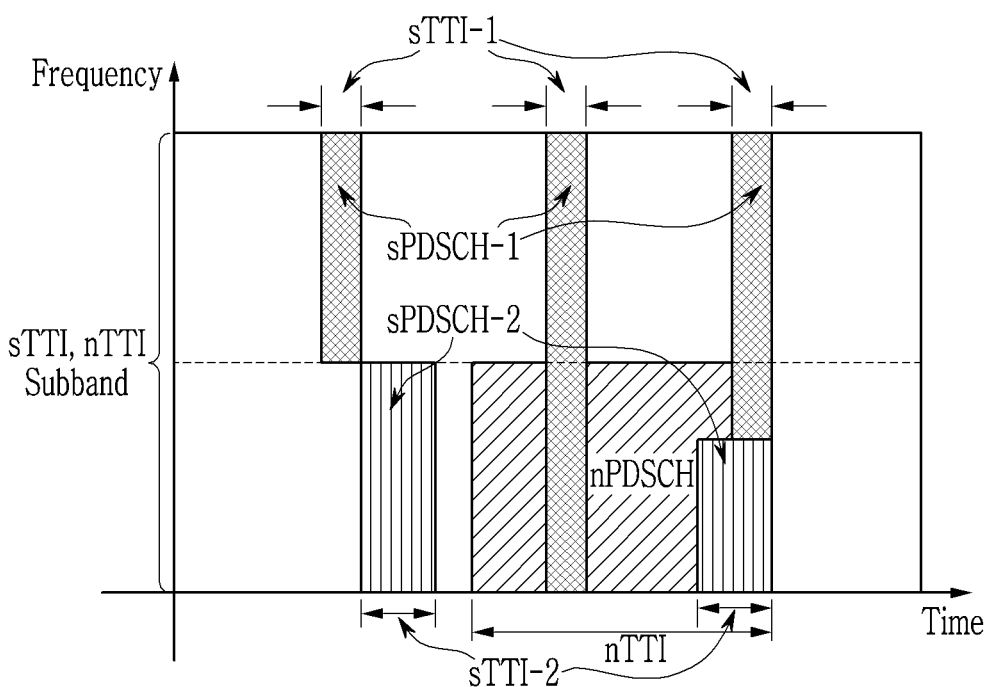

FIG. 12 and FIG. 13 show a coexistence scheme of sTTI transmissions having different lengths in a scheduling method according to an embodiment of the present invention.

Referring to FIG. 12, in one embodiment, a resource region of a scheduled sPDSCH-2 may be allowed to be invaded by an sPDSCH-1 which is scheduled later. This method can maximally guarantee resource allocation flexibility of the base station, thereby maintaining the advantages of the overlapping scheme described with reference to FIG. 6 to FIG. 9. When the resource region of sPDSCH-2 is invaded by the sPDSCH-1, the puncturing, rate matching, or superposition transmission scheme may be applied to the sPDSCH-2 transmission as described with reference to FIG. 8 and FIG. 9. Alternatively, as shown in FIG. 13, a scheme that does not allow overlapping between the sPDSCH-1 and the sPDSCH-2 may be applied. In this case, the resource regions for the sPDSCH-1 and sPDSCH-2 may be distinguished by the FDM or TDM scheme, or the sPDSCH-1 and sPDSCH-2 may share an entire frequency band without distinguishing the resource regions.

While the two sTTIs having different lengths are described above, if three or more sTTIs have different lengths, the above-described method may be applied to some sTTIs among the three or more sTTIs. For example, it is assumed that three sTTIs, i.e., sTTI-1, sTTI-2, and sTTI-3 have different lengths. When the FDM scheme is applied, an sPDSCH-1 and an sPDSCH-2 may share the same frequency resource region and an sPDSCH-3 may be transmitted through another frequency resource region. When the overlapping scheme is applied, the resource overlapping may not be allowed between the sPDSCH-1 and the sPDSCH-2, and the resource overlapping may be allowed between the sPDSCH-1 and the sPDSCH-3 or between the sPDSCH-2 and the sPDSCH-3.

In some embodiments, if the nPDSCH and sPDSCH coexist within one carrier, the base station may reserve a time resource for the sPDSCH transmission by sTTI unit. An sTTI resource reservation method for the sPDSCH transmission is described with reference to FIG. 14 to FIG. 28.

Figure 14:
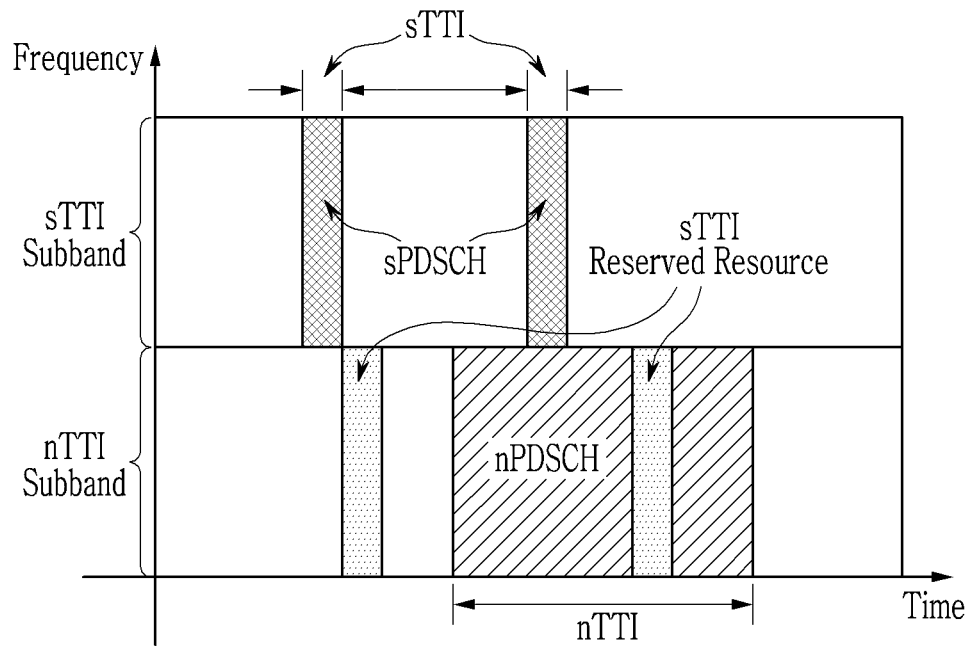
FIG. 14 and FIG. 15 each show an sTTI resource reservation method in a scheduling method according to an embodiment of the present invention.
Figure 15:
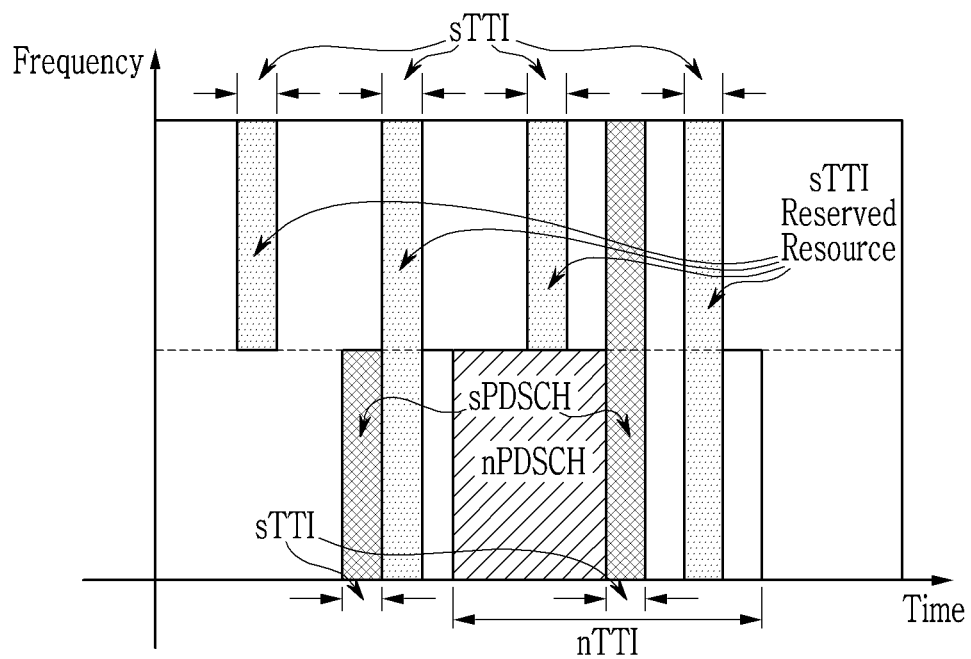

FIG. 14 and FIG. 15 each show an sTTI resource reservation method in a scheduling method according to an embodiment of the present invention.

As shown in FIG. 14 and FIG. 15, one or more sTTI resources (i.e., sPDSCH resources) may be reserved within one nTTI interval. The reserved sTTI resources may occupy an entire system bandwidth or may occupy only some bands.

In this case, a base station may not schedule an nPDSCH on a resources reserved for an sPDSCH transmission and may schedule the nPDSCH on remaining resource regions other than the resources reserved for the sPDSCH transmission. Therefore, sTTI data occurred after the nPDSCH is scheduled may be transmitted by scheduling the sPDSCH on the reserved resource so that the resource region on which nPDSCH is scheduled in advance can be prevented from being invaded by the sPDSCH which is scheduled later. In some embodiments, a region on which the sPDSCH is scheduled may be confined within the reserved sTTI resource regions. Then, a terminal monitoring the sPDCCH can monitor the sPDCCH only within the sTTI reserved resources. This can lower the sPDCCH monitoring complexity of the terminal.

In one embodiment, the sTTI resource reservation may be applied to the TDM scheme described with reference to FIG. 3 to FIG. 5. Referring to FIG. 14, the base station may set sTTI reserved resources in a remaining frequency region other than sPDSCH resource regions. The resource reservation is unnecessary in a frequency band set to the sPDSCH resource region because the sPDSCH can be scheduled on the frequency band at any time point. By using the sTTI reserved resources, more sPDSCHs can be scheduled within one sTTI interval or the sPDSCHs can be scheduled on more resources so that the transmission reliability can be increased.

In another embodiment, the sTTI resource reservation may be applied to the resource overlapping scheme described with reference to FIG. 6 to FIG. 9. Referring to FIG. 15, the sTTI reserved resource may be set on the entire frequency band. In this case, the sTTI reserved resource may occupy only a specific subband or may occupy the entire band. The base station may avoid the resource overlapping with the nPDSCH by transmitting the sPDSCH through the sTTI reserved resource. When the sPDSCH is transmitted without the sTTI reserved resource, the sPDSCH may invade a part of the nPDSCH resource region which is scheduled in advance. Then, information indicating that the part of the nPDSCH resource region is invaded by the sPDSCH may be additionally required to minimize the deterioration of nPDSCH reception performance at the terminal to which the nPDSCH is scheduled. However, when the sPDSCH is transmitted through the sTTI reserved resource, the terminal to which the nPDSCH is scheduled does not need to know whether the sPDSCH is transmitted within the nTTI interval. When informing, through the sPDCCH, the terminal whether the sPDSCH is transmitted, the nPDSCH reception performance of the terminal having no sPDCCH reception capability can be ensured by transmitting the sPDSCH through the sTTI reserved resource.

In yet another embodiment, time resources over which the sTTI reserved resource can be set may be limited. For example, the sTTI reserved resource may not be set in an sTTI interval in which a channel or signal allocated to a fixed location exists. Examples of the channel or signal allocated to the fixed position include a cell-specific reference signal, a synchronization signal (e.g., primary synchronization signal (PSS) or secondary synchronization signal (SSS)), and a channel carrying broadcasting information (e.g., physical broadcasting control channel (PBCH)). It may be set that any signal or channel other than the sPDSCH cannot be transmitted on the sTTI reserved resource.

In yet another embodiment, the base station may signal sTTI resource reservation information to the terminal. For example, the base station may inform the terminal whether a resource is reserved for each sTTI, by transmitting a bitmap corresponding to a continuous sTTIs in the time axis. That is, when n bits of the bitmap correspond to n sTTIs being continuous in time axis, each bit having a predetermined value (e.g., "1") may indicate that a resource of a corresponding sTTI is reserved. The bitmap may correspond to a plurality of sTTIs within one nTTI interval or one subframe. Alternatively, the bitmap may correspond to a plurality of sTTIs within a plurality of nTTI intervals or a plurality of subframes. In one embodiment, the sTTI resource reservation information may be transmitted through a higher layer signaling. In another embodiment, the sTTI resource reservation information may be transmitted through a physical layer signaling. An sPDCCH, an nPDCCH, or an nEPDCCH (normal Enhanced PDCCH) may be used for the physical layer signaling.

Next, a case where the sTTI resource reservation is not used and a case where the sTTI resource reservation is used are compared and described.

Figure 16:
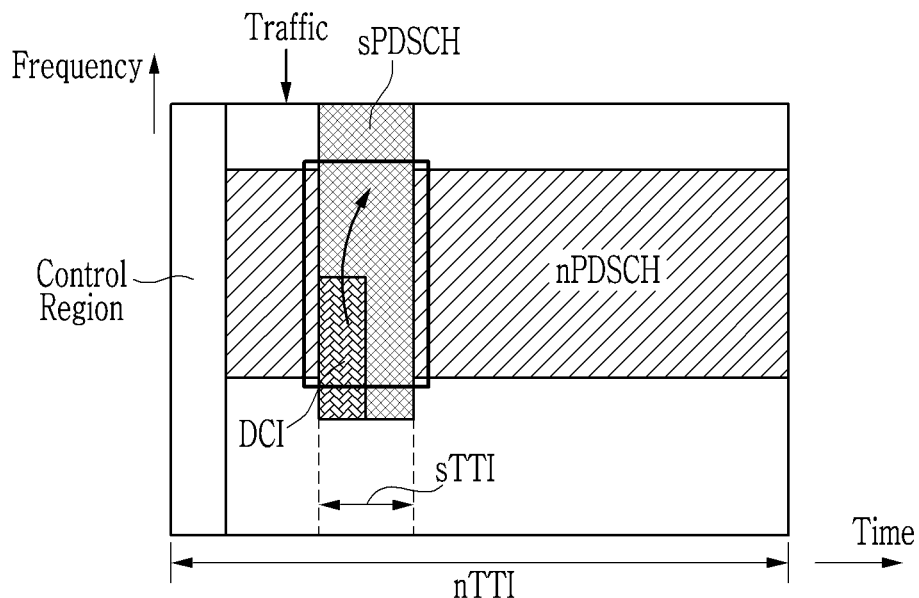
FIG. 16 shows a transmission example of a case where an sTTI resource reservation is not used.
Figure 17:
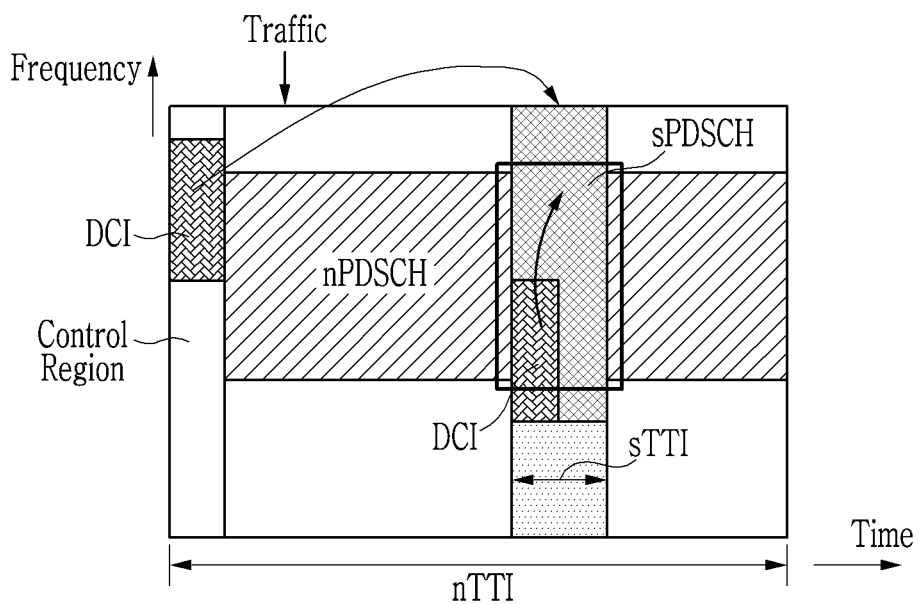
FIG. 17 shows a transmission example of a case where an sTTI resource reservation is used.

FIG. 16 shows a transmission example of a case where an sTTI resource reservation is not used, and FIG. 17 shows a transmission example of a case where an sTTI resource reservation is used. An example of configuring a slot and a sub-slot as an nTTI and an sTTI is shown in FIG. 16 and FIG. 17.

Referring to FIG. 16, an sPDSCH may be scheduled and transmitted on an nPDSCH resource region which is scheduled in advance. The nPDSCH data of a resource region on which the sPDSCH is newly scheduled may be processed by the puncturing, rate matching, or superposition redundant transmission scheme as described above. The sPDSCH may be transmitted on a part of the entire sTTI resource region, and the sPDSCH resource region within the sTTI may be indicated to a terminal through a physical layer signaling, for example, downlink control information (DCI). In this case, a latency between a time point at which downlink traffic, for example, URLLC traffic requesting a short transmission latency occurs and a transmission time point of the sPDSCH can be minimized.

Referring to FIG. 17, an sPDSCH may be transmitted on an sTTI resource region which is reserved or set in advance. For example, the sTTI reserved resource may be set through a physical layer signaling (e.g., DCI). Specifically, a base station may transmit the DCI to a terminal through a control channel (e.g., nPDCCH) of a control region, and a terminal may acquire a position of the sTTI reserved resource within a data region by receiving the DCI. In this case, the terminal receiving only the DCI may be a terminal receiving only the nPDSCH, a terminal receiving only the sPDSCH, or a terminal receiving both the nPDSCH and the sPDSCH. It may be set to the terminal whether the nPDSCH and/or the sPDSCH can be received through the higher layer signaling. The sPDSCH may be transmitted over the entire sTTI reserved resource or may be transmitted on some resource region within the sTTI reserved resource. If the sPDSCH is transmitted on the some resource region within the sTTI reserved resource, the scheduling region of the sPDSCH may be indicated to the terminal by the physical layer signaling (e.g., DCI) in the same sTTI reserved resource. In this case, a scheduling delay may occur by a time interval between a time point at which downlink traffic, for example, URLLC traffic occurs and the sTTI reserved resource. However, since the nPDSCH is scheduled on the resource region other than the sTTI reserved resource, the reception performance of the nPDSCH is not affected by the sPDSCH transmission in the sTTI reserved resource. This may be particularly useful for a terminal that cannot monitor the sPDCCH or a terminal that is set not to monitor the sPDCCH.

In some embodiments, only time resource information among the time resource information and frequency resource information of the sTTI reserved resource may be dynamically set through the physical layer signaling. The frequency resource information may be set through the higher layer signaling or may be predefined. In one embodiment, the time resource information may be represented by a bitmap, and the base station may transmit the bitmap through the physical layer signaling. Hereinafter, such an embodiment is described with reference to FIG. 18 to FIG. 21.

Figure 18:
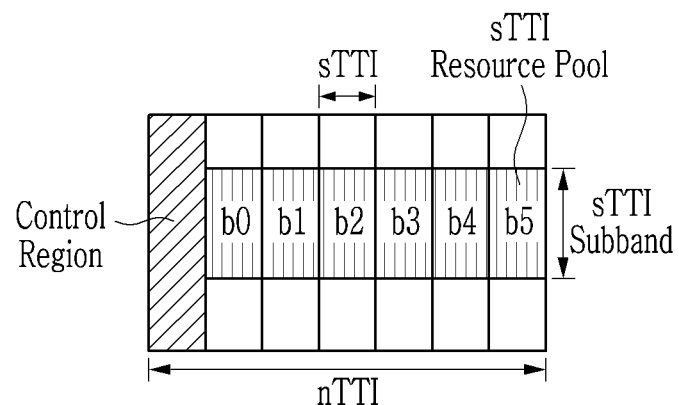
FIG. 18 and FIG. 19 show a single nTTI scheduling in a scheduling method according to an embodiment of the present invention.
Figure 19:
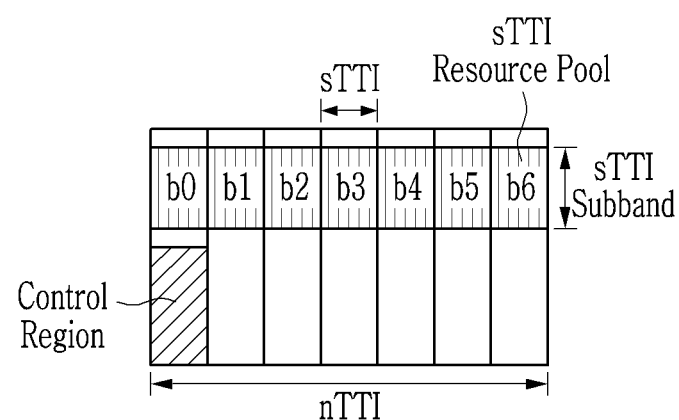
Figure 20:
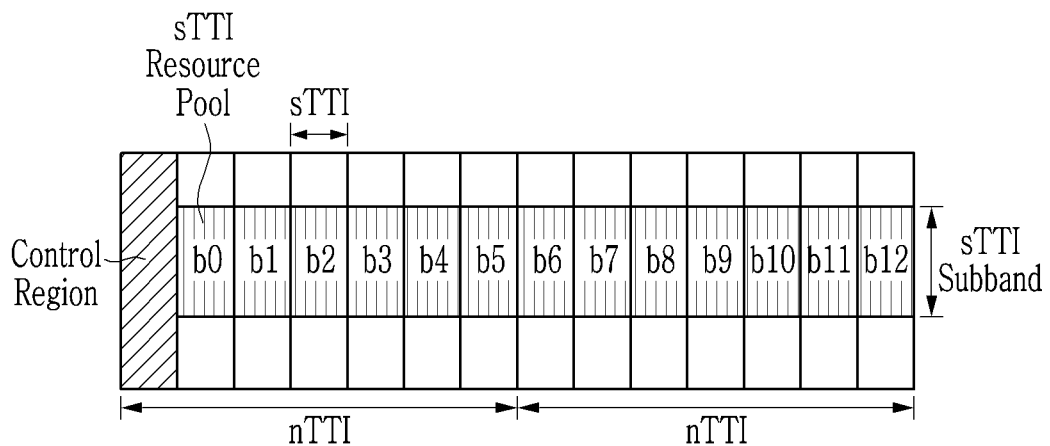
FIG. 20 shows a multiple nTTI scheduling in a scheduling method according to an embodiment of the present invention.
Figure 21:
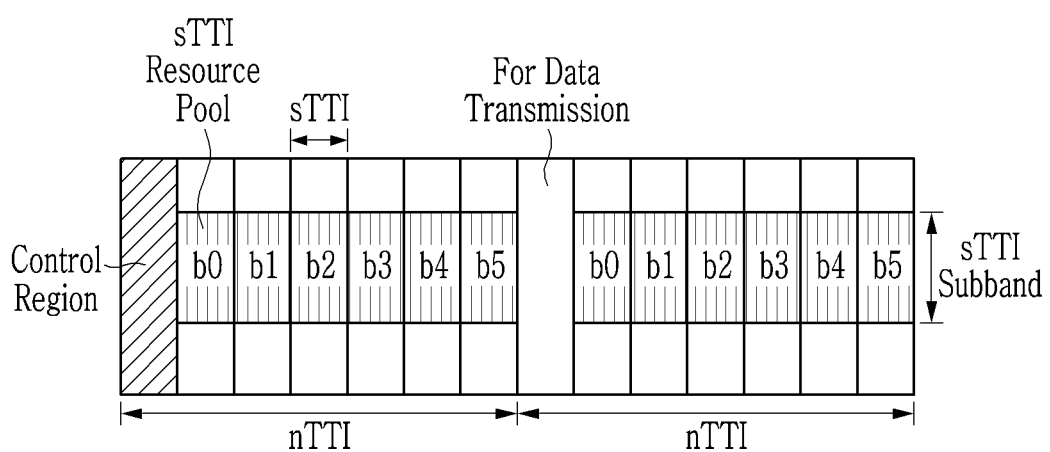
FIG. 21 shows a scheduling of combining a single nTTI scheduling and a multiple nTTI scheduling in a scheduling method according to an embodiment of the present invention.

FIG. 18 and FIG. 19 show a single nTTI scheduling in a scheduling method according to an embodiment of the present invention, FIG. 20 shows a multiple nTTI scheduling in a scheduling method according to an embodiment of the present invention, and FIG. 21 shows a scheduling of combining a single nTTI scheduling and a multiple nTTI scheduling in a scheduling method according to an embodiment of the present invention.

Referring to FIG. 18 to FIG. 21, an nPDCCH may be transmitted in a control region of an nTTI.

As shown in FIG. 18 and FIG. 19, a single nTTI scheduling in which data are scheduled in one nTTI (or one subframe) with a single scheduling may be used. The single nTTI scheduling may include a control region per nTTI. The sTTI reserved resource may be set within an sTTI resource pool.

Referring to FIG. 18, in one embodiment, an sTTI resource pool and a control region may be formed by a TDM scheme. When there are a plurality of sTTI transmission opportunities (for example, six sTTI transmission opportunities) in one nTTI, a bitmap indicating time resource information of an sTTI reserved resource may include a plurality of bits b0, b1, b2, b3, b4, and b5 (6 bits in an example of FIG. 18), and the respective bits may be mapped to the different sTTI transmission opportunities, i.e., the different sTTI time resources. Further, the bit corresponding to the reserved sTTI time resource in the bitmap delivered through the control region may be set to a predetermined value (e.g., "1").

Referring to FIG. 19, in another embodiment, a part of an sTTI resource pool and a control region may be formed by an FDM scheme. That is, the control region may be set on a part of a band and the sTTI resource pool may include a time interval occupied by the control region. When there are a plurality of sTTI transmission opportunities (e.g., seven sTTI transmission opportunities) in one sTTI, a bitmap indicating time resource information of the sTTI reserved resource may include a plurality of b0, b1, b2, b3, b4, b5, and b6 (7 bits in an example of FIG. 19), and the respective bits may be mapped to the different sTTI transmission opportunities, i.e., the different sTTI time resources.

Referring to FIG. 20, in yet another embodiment, a multiple nTTI scheduling in which data are scheduled in a plurality of nTTIs (or a plurality of subframes) with a single scheduling may be used In this case, a control region may not exist in the remaining nTTIs other than the first nTTI among the plurality of nTTIs. It is shown in FIG. 20 that data are scheduled in two nTTIs by the multiple nTTI scheduling. An sTTI resource pool may exist within the two nTTIs and may have a plurality of sTTI transmission opportunities (e.g., thirteen nTTI transmission opportunities). A bitmap indicating time resource information of an sTTI reserved resource may include a plurality of bits b0 to b12 (13 bits in an example of FIG. 20), and the respective bits may be mapped to the different sTTI transmission opportunities, i.e., the different sTTI time resources. Alternatively, as described with reference to FIG. 19, when the sTTI resource pool includes the time interval of the control region, the bitmap may include 14 bits.

Referring to FIG. 21, in yet another embodiment, a single nTTI scheduling and a multiple nTTI scheduling may be used in combination. The multiple nTTI scheduling in which an sTTI resource pool and a bitmap are defined for each nTTI based on the single nTTI scheduling may be used. As shown in FIG. 21, when the single nTTI scheduling described with reference to FIG. 18 is used as a basis, the bitmap may include 6 bits to indicate a plurality of sTTI resource opportunities in each nTTI. In this case, when data are scheduled in the two nTTIs, twelve reservable sTTI transmission opportunities may be given. As such, when the sTTI resource pool and the control domain are time-divisionally multiplexed, the multiple nTTI scheduling described with reference to FIG. 21 may reduce the reservable sTTI transmission opportunities compared to the multiple nTTI scheduling described with reference to FIG. 20. When the single nTTI scheduling described with reference to FIG. 19 is used as a basis, the bitmap may include 7 bits. If a base station transmits the bitmap to a terminal through the control region of the beginning nTTI among the plurality of nTTIs, the terminal may acquire a position of the time resource reserved for the sTTI transmission by applying the bitmap to each nTTI.

In some embodiments, a multi-slot scheduling may be used for nTTI and sTTI configurations. For example, the nTTI may be composed of a plurality of slots and the sTTI may be composed of one slot. In this case, the multi-slot scheduling may be used for an nTTI transmission and a single slot scheduling may be used for an sTTI transmission. This embodiment is described with reference to FIG. 22.

Figure 22:
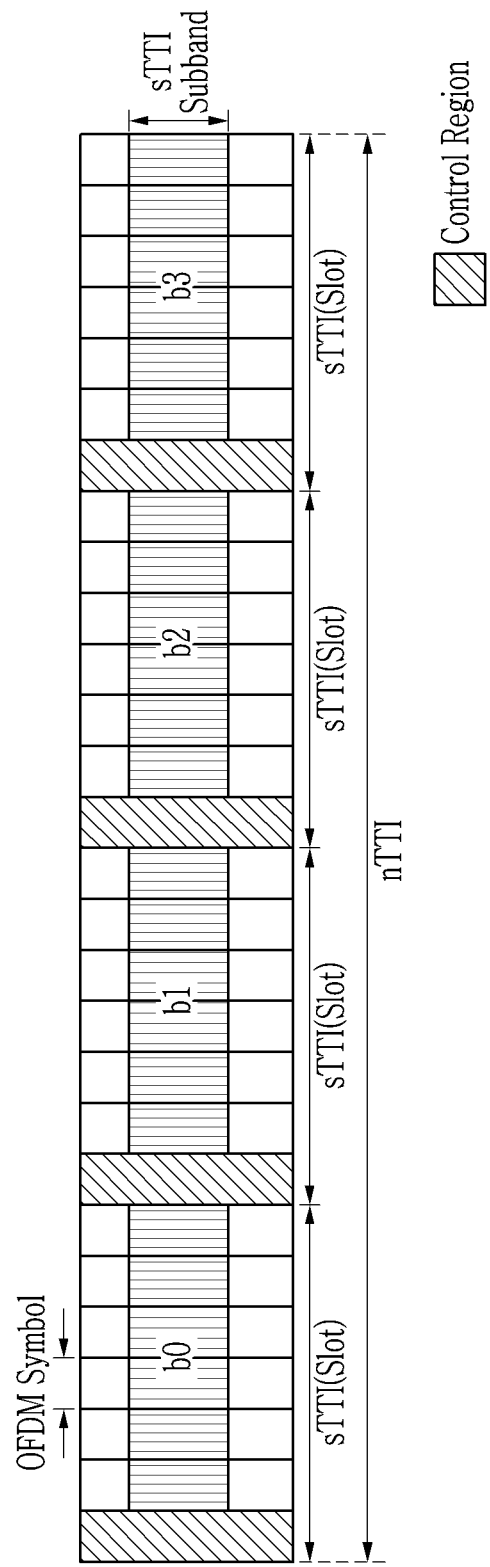
FIG. 22 shows a case where a multi-slot scheduling is used for an nTTI transmission and a single slot scheduling is used for an sTTI transmission in a scheduling method according to an embodiment of the present invention.

FIG. 22 shows a case where a multi-slot scheduling is used for an nTTI transmission and a single slot scheduling is used for an sTTI transmission in a scheduling method according to an embodiment of the present invention.

Referring to FIG. 22, an nTTI includes a plurality of slots (for example, four slots), and each slot corresponds to an sTTI. For example, one slot may be composed of seven OFDM symbols. In this case, both an nPDCCH and an sPDCCH may be transmitted on a control region of each slot, but a terminal performing an nTTI-based transmission may monitor only one nPDCCH per nTTI in order to reduce the PDCCH monitoring complexity of the terminal. A bitmap indicating time resource information of an sTTI reserved resource may be transmitted on a control region where the nPDCCH is scheduled. In one embodiment, the terminal may be set to monitor only the control region of the beginning sTTI in the nTTI and not monitor remaining control regions. Then, the bitmap may be transmitted in the control region of the first sTTI, the bitmap may include a plurality of bits b0, b1, b2, and b3 (4 bits in an example of FIG. 22), and each bit may correspond to the sTTI resource region.

In embodiments described with reference to FIG. 18 to FIG. 22, a frequency resource region for the sTTI transmission may be an entire system bandwidth or a partial region. When multiple numerologies are frequency-divisionally multiplexed within one carrier, a frequency resource region for the sTTI transmission may be the whole or a part of a frequency region occupied by the numerology used for the sTTI transmission.

In some embodiments, time resource information (e.g., a bitmap) of the sTTI reserved resource may be transmitted to the terminal through the DCI. The DCI may be transmitted on a common search space of the nPDCCH or nEPDCCH, to allow a plurality of terminals to receive the DCI. In one embodiment, the terminal may monitor the DCI only when it is set to receive the DCI.

Next, various transmission examples using an sTTI reserved resource are described with reference to FIG. 23 to FIG. 26.

FIG. 23, FIG. 24, FIG. 25, and FIG. 26 each show a transmission example using an sTTI resource reservation.

Figure 23:
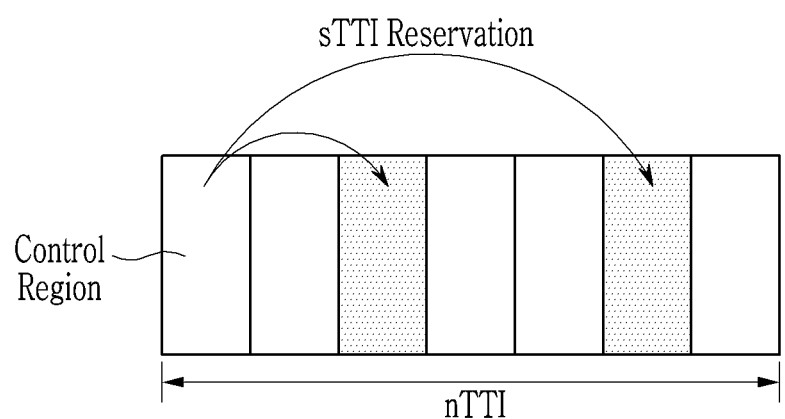
FIG. 23, FIG. 24, FIG. 25, and FIG. 26 each show a transmission example using an sTTI resource reservation.
Figure 24:
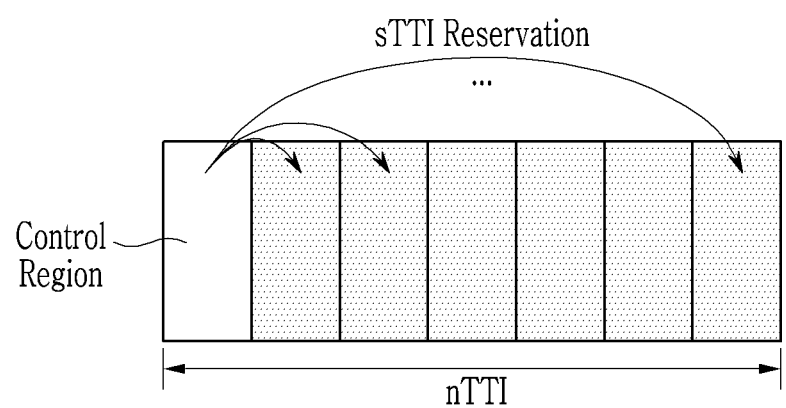

As shown in FIG. 23 and FIG. 24, in one example, a base station may variably operate the number of sTTI reserved resources according to an amount of downlink traffic, for example, URLLC traffic. That is, when the base station sets the sTTI reserved resources for a general amount of downlink traffic as shown in FIG. 23, if downlink traffic more than the general amount arrives, the base station may increase the number of the sTTI reserved resources as shown in FIG. 24.

Figure 25:
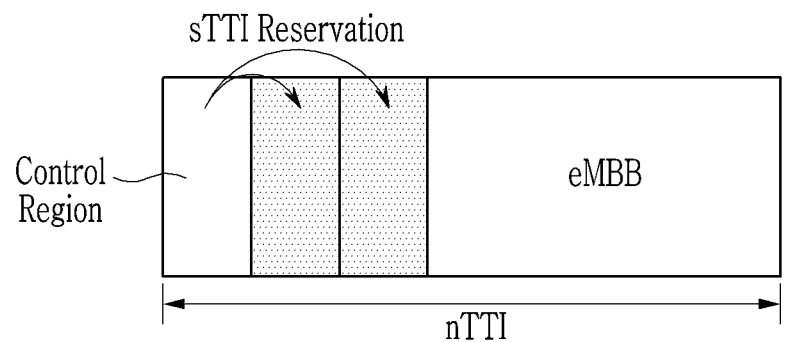
Figure 26:
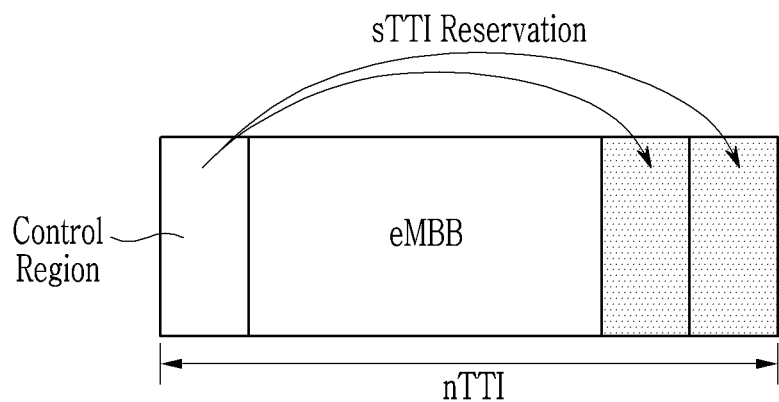

In another example, when there is a small amount of residual downlink traffic (e.g., residual URLLC traffic) or when a retransmission for a downlink transmission (e.g., URLLC transmission) of a previous subframe is required, the base station may reserve front sTTIs for the sTTI transmission and may use remaining data regions for other traffic transmission (e.g., eMBB transmission) as shown in FIG. 25.

In yet another example, as a method of securing a processing time for downlink reception (e.g., reception of eMBB requiring a high transmission rate) of the terminal, the base station may reserve rear sTTIs for the sTTI transmission and may transmit eMBB data on remaining data regions.

As described above, since the base station can set all possible sTTI reserved resource configurations to the terminal, the base station can dynamically support various usage scenarios, but the overhead of control information used for setting the sTTI reserved resource may be great. In some embodiments, only some cases of the sTTI reserved resource configurations may be used to reduce the control information overhead. For example, a set of all cases for reserving X sTTIs or up to X sTTIs within one nTTI (or one subframe or slot) may be used as the time resource information of the sTTI reserved resource.

In some embodiments, both the time resource information and the frequency resource information of the sTTI reserved resource may be dynamically set by a physical layer signaling. In another embodiment, both the time resource information and the frequency resource information of the sTTI reserved resource may be set by a higher layer signaling. Since the higher layer signaling has less overhead constraints than the physical layer signaling, both the time and frequency resource information may be defined as a bitmap when the higher layer signaling is used. When the sTTI resource is reserved for a semi-persistent scheduling (SPS), it may be enough to use only the higher layer signaling.

In yet another embodiment, both the physical layer signaling and the higher layer signaling may be used to set the time resource information of the sTTI reserved resource. For example, the number of possible sTTI resource reservations may be set to one or more by that higher layer signaling, and one of them may be set dynamically by the physical layer signaling.

In yet another embodiment, a default set value of the sTTI reserved resource may be transmitted by the higher layer signaling, and the physical layer signaling may be used to set the sTTI reserved resource only when the sTTI reserved resource configuration is to be changed. This can help to save nPDCCH or nEPDCCH resources by minimizing the transmission of the physical layer signaling. For example, when RRC signaling is used for a resource reservation for an SPS-based transmission and a dynamic scheduling, or an SPS retransmission occurs, a DCI signaling may be additionally used at that point.

In some embodiments, a periodically transmitted broadcast signal or channel (e.g., PSS, SSS, or PBCH) may not overlap with the sTTI transmission. In one embodiment, in a case of the resource overlapping scheme, the terminal may assume that no sTTI data are scheduled on a resource to which the broadcast signal or channel is transmitted. Alternatively, even if an sPDSCH is scheduled on a resource block including a part of the resource of the broadcast signal or channel, the terminal may receive the sPDSCH on a remaining region excluding the resource of the broadcast signal or channel. In another embodiment, in a case of the sTTI resource reservation scheme, the terminal may assume that the resource on which the broadcast signal or channel is transmitted is not reserved for the sTTI transmission. Alternatively, even if a part of the resource on which the broadcast signal or channel is transmitted is set as the sTTI reserved resource, the terminal may assume that the sTTI data are not scheduled in the corresponding region. This embodiment may be applied in the same manner to protect a control channel or reference signal (e.g., DMRS (demodulation reference signal) for nPDSCH decoding) as well as the broadcast signal or channel.

In some embodiments, the number of OFDM symbols occupied by an nPDCCH region may be variable when the nPDCCH region is periodically present. When there is much downlink control information to be transmitted to the terminal, the nPDCCH region may be extended on the time domain. In this case, the nPDCCH region may overlap with a part of the sTTI region. For example, if the nPDCCH occupies OFDM symbols #0 to #2 in a certain subframe and the sTTI occupies OFDM symbols #2 and #3, the nPDCCH may partially overlap with sTTI. In this case, the terminal may not expect to receive the DMRS for sPDSCH and/or sPDSCH decoding in the sTTI overlapping with the nPDCCH region. Alternatively, the terminal may receive the DMRS for the sPDSCH and/or sPDSCH decoding in the remaining sTTI region excluding the region overlapping with the nPDCCH region.

In some embodiments, the sTTI reserved resource in the sTTI resource reservation scheme may be used for a semi-persistent scheduling of an sPDSCH. In this case, an sPDSCH transmission by the semi-persistent scheduling may be limited to occur only within the sTTI reserved resource. In one embodiment, the sPDSCH transmission by semi-persistent scheduling within the sTTI reserved resource may include both an initial transmission and a retransmission. In another embodiment, the initial transmission of the sPDSCH by semi-persistent scheduling may be performed only within the sTTI reserved resource, and the retransmission may also be scheduled in a region other than the sTTI reserved resource. For example, the retransmission of the sPDSCH may be scheduled by the FDM scheme or the resource overlapping scheme described above.

In some embodiments, when the sTTI resource for the sPDSCH transmission is reserved by using the sTTI resource reservation scheme, the sTTI reserved resource may be used for other purposes other than the sPDSCH transmission if the sPDSCH is not scheduled on the reserved resource. The base station may determine that the sPDSCH is not scheduled on the sTTI reserved resource before a predefined time (e.g., few sTTIs) from a time point at which the transmission of that sTTI reserved resource is performed.

In some embodiments, the sTTI reserved resource may be used to additionally allocate nPDSCH data. If there is an nPDSCH which has been scheduled in an nTTI interval to which the sTTI reserved resource belongs or on that sTTI reserved resource, the base station may allocate additional data (for example, a coded bit sequence) for a transport block transmitted on the nPDSCH to the sTTI reserved resource. Accordingly, the nPDSCH reception performance can be enhanced by lowering an effective code rate of the nPDSCH transmission. In this case, a scheme of transmitting a predefined bit sequence or a scheme of selectively transmitting a bit sequence by the base station may be used as a scheme of selecting the coded bit sequence to be additionally transmitted. For example, it is assumed that a rate matching scheme in which a total coded bit sequence is stored in a cyclic buffer and a part of the bit sequence is selectively transmitted according to a redundancy version (RV) value like the LTE. In this case, data to be additionally transmitted on the sTTI reserved resource may correspond to the same HARQ process as the scheduled nPDSCH. Further, the bit sequence additionally transmitted on the sTTI reserved resource may be a bit sequence that is continuous to and has same RV as the bit sequence of the scheduled nPDSCH on a buffer space. Alternatively, the bit sequence to be additionally transmitted may be discontinuous to the bit sequence of the scheduled nPDSCH on the buffer space. For this, different RVs may be applied for extracting the two bit sequences. For example, if the scheduled nPDSCH has RV=0, the bit sequence to be additionally transmitted through the sTTI reserved resource may be a bit sequence defined by RV=1. The RV for the bit sequence to be additionally transmitted on the same buffer space through the sTTI reserved resource may be defined independently of the RV for the nPDSCH. The base station may set information (e.g., RV) on the bit sequence to the terminal by a physical layer signaling. For example, a DCI including the information on the bit sequence may be transmitted through an sPDCCH corresponding to that sTTI reserved resource.

In one embodiment, when the sTTI reserved resource is used to additionally transmit the nPDSCH data, the base station may transmit, to the terminal to which the nPDSCH is scheduled, information that the additional data for the nPDSCH are allocated on the sTTI reserved resource. For example, the base station may transmit the information to the terminal through the sPDCCH.

In one embodiment, if the sTTI reserved resource can be used for both the sPDSCH transmission and the additional data transmission for the nPDSCH, the base station may signal a purpose of the sTTI reserved resource to the terminal. For example, the base station may inform the purpose of the sTTI reserved resource through the sPDCCH corresponding to that sTTI reserved resource. When the sTTI reserved resource has only two purposes, control information for informing the purposes may have one bit. The control information may be transmitted to terminals in common or may be transmitted in a terminal-specific manner.

In some embodiments, if no signal or channel other than the sPDSCH is set to be transmitted on the sTTI reserved resource, the sTTI reserved resource may be used for a similar purpose to a MBSFN (Multicast-Broadcast Single-Frequency Network) subframe of the LTE system. For example, the sTTI reserved resource may be used to transmit sTTI-based broadcast information or may support forward compatibility for a transmission that will be defined in the future. However, in a case of the sTTI reserved resource for ensuring the forward compatibility, it may be unnecessary to support a transmission of control information and data. Therefore, a signaling for the sTTI reserved resource and a signaling of the reserved resource for ensuring the forward compatibility may be distinguished.

As described above, according to embodiments of the present invention, the base station may set the specific time-frequency resource as the sTTI reserved resource. Alternatively, the base station may set the specific frequency resource as the sTTI reserved resource, or may set the specific time resource as the sTTI reserved resource. While an example in which the sTTI reserved resource is used to transmit the URLLC signal has been described, the sTTI reserved resource may be used to transmit other downlink, uplink, and sidelink NR signals. Alternatively, the NR terminal may expect that no NR signal is transmitted on the reserved resource which is set. This may be used to support a coexistence scenario between the NR and the other RAT, or to reconfigure an RF module using the reserved resource. As an example of the coexistence scenario, it may be considered that an LTE NB-IoT (Narrow Band Internet of Things) carrier is allocated and co-exist within an NR carrier bandwidth. The uplink and downlink carrier of the NB-IoT is composed of 12 subcarriers having a subcarrier spacing of 15 kHz in most cases. That is, the NB-IoT carrier occupies a 180 kHz bandwidth, which is aligned in the frequency axis on one physical resource block (PRB) of an LTE normal carrier. However, in a case of the coexistence with the NR, the PRB of the NR carrier may not be aligned, in the frequency axis, on the bandwidth of the NB-IoT carrier.

Figure 27:
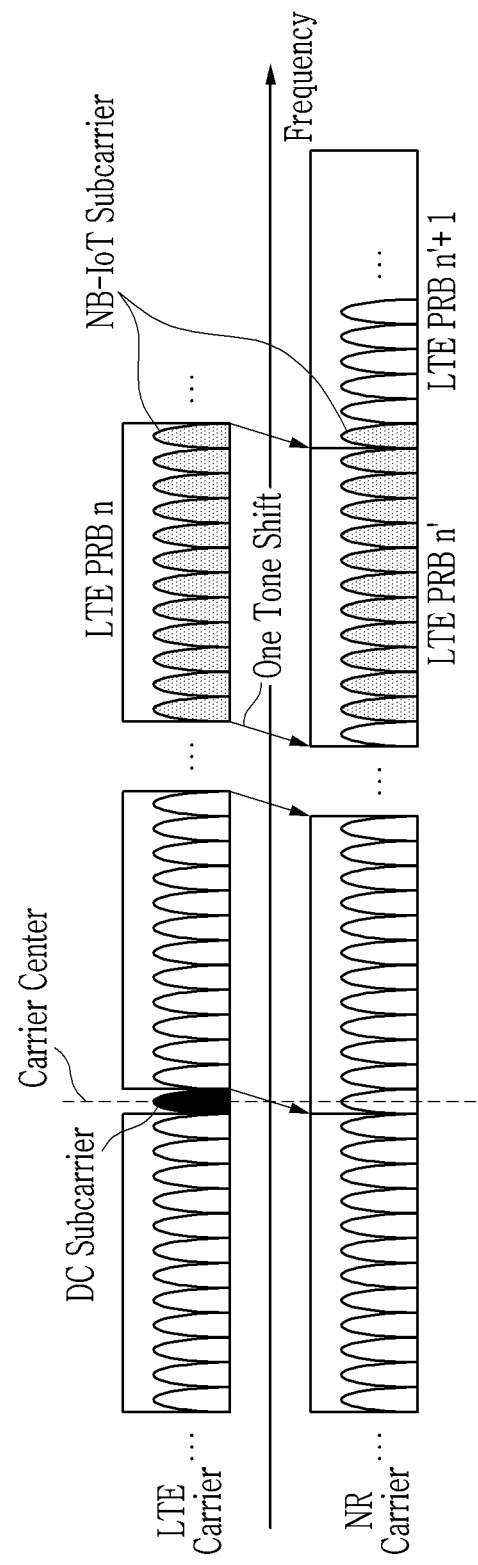
FIG. 27 and FIG. 28 each show a frequency axis relationship of an NR PRB and an LTE NB-IoT carrier in downlink.
Figure 28:
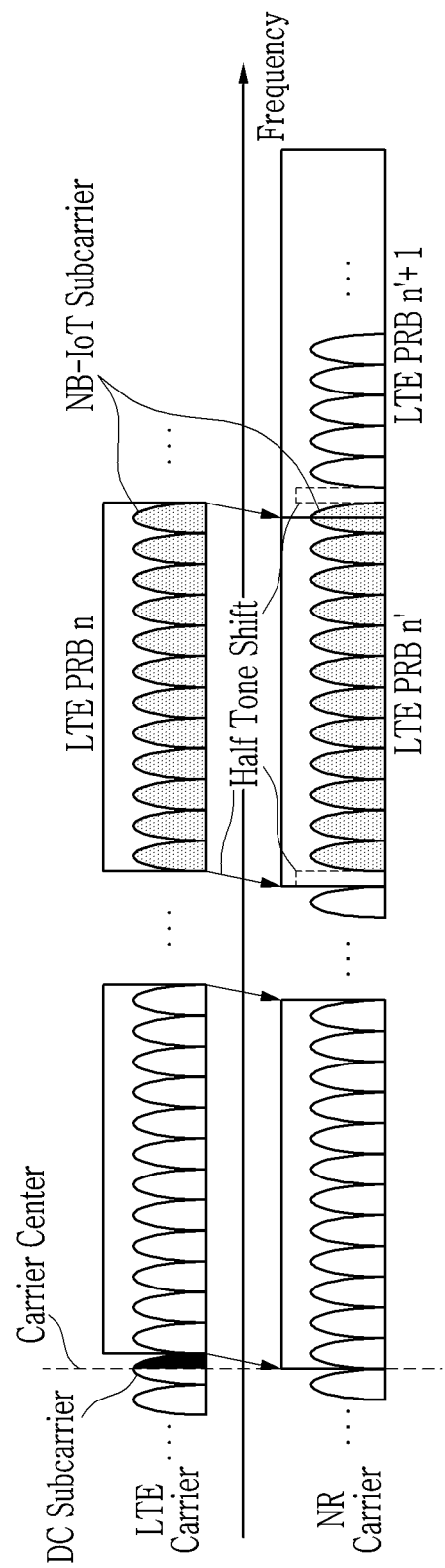

FIG. 27 and FIG. 28 each show a frequency axis relationship of an NR PRB and an LTE NB-IoT carrier in downlink.

In FIG. 27 and FIG. 28, it is assumed that all subcarriers have a subcarrier spacing of 15 kHz, and bandwidths of an LTE PRB, an NR PRB, and an NB-IoT carrier are 180 kHz.

Differently from the LTE system, explicit DC (Direct Current) subcarriers may not be defined in the NR system. In this case, a position of a center frequency of the NR carrier may be determined as shown in FIG. 27 and FIG. 28.

Referring to FIG. 27, in one embodiment, a center of the NR carrier may be located on one subcarrier. In this case, a boundary of the NR PRB may be different from a boundary of the LTE PRB by −1, 1, 5, or 7 subcarrier spacings in some bands of the NR carrier due to whether the explicit DC subcarrier exists and the number of explicit DC subcarriers. FIG. 27 shows an example in which the LTE system uses one DC subcarrier and the boundary of the NR PRB is shifted from the boundary of the LTE PRB by one subcarrier spacing in a frequency region that is higher than the center of the NR carrier.

As such, when the boundary of the NR PRB is shifted from the boundary of the LTE PRB by one subcarrier spacing, the boundary of the NR PRB is different from the boundary of the bandwidth of the NB-IoT carrier by one subcarrier spacing. When a reserved resource is set, in units of PRB, to the NR terminal, two PRBs overlapping with the NB-IoT carrier may be set as the reserved resource in order to protect a signal of the NB-IoT carrier. Alternatively, in order to protect the signal of the NB-IoT carrier with only one reserved resource of the PRB, the base station may configure frequency offset information (e.g., n subcarrier spacings where n is an integer) together when configuring the reserved resource in units of PRB or PRB group to the terminal. In the example of FIG. 27, the base station may set one NR PRB, as the reserved resource, to the terminal, and may instruct the terminal to apply an offset of +1 or −1 subcarrier spacing to that NR PRB. The terminal may determine a frequency axis position of the reserved resource by applying the offset, and may receive or transmit data on a region other than the reserved resource when the data are scheduled in the PRB including the reserved resource. That is, a data channel may be rate-matched on the reserved resource in the PRB that partially includes the reserved resource.

Referring to FIG. 28, in another embodiment, a center of the NR carrier may be located between two adjacent subcarriers. Assuming that the LTE system and the NR system use the same carrier raster or channel raster and that the LTE system uses one DC subcarrier, there may exist an offset corresponding to a half of one subcarrier spacing between the LTE system subcarriers and the NR system subcarriers. In this case, since the NR subcarriers and the NB-IoT subcarriers are not orthogonal to each other in the frequency axis, a guard band may be allocated around the NB-IoT carrier in order to protect the NB-IoT signal of the NR carrier. Then, because the base station sets a plurality of PRBs as a reserved resource to the terminal in order to protect the signal of the NB-IoT carrier, the frequency efficiency may be deteriorated.

On the other hand, if a center of the NR carrier in uplink is located on one subcarrier as shown in FIG. 27, an offset corresponding to a half of one subcarrier spacing may occur between the LTE system subcarriers and the NR system subcarriers. Therefore, when the NR carrier coexists with the uplink NB-IoT carrier, the frequency efficiency may be deteriorated. However, when the positions of the center frequencies of the NR carrier in uplink and downlink are determined in the same manner, the uplink subcarriers and the downlink subcarriers can be aligned on the frequency axis in a system in which uplink and downlink frequencies are synchronized. Accordingly, a transmission scheme using this concept may be considered.

As described above, in the case of downlink, it may be suitable to determine the center frequency position of the NR carrier as described with reference to FIG. 27. In the case of uplink, it may be suitable to determine the center frequency position of the NR carrier as described with reference to either FIG. 27 or FIG. 28 according to the circumstance. Therefore, in some embodiments, the base station may signal a rule of determining the center frequency position of the uplink NR carrier to the terminal. For example, the methods described with reference to FIG. 27 and FIG. 28 may be predefined, and the base station may signal either one of the two methods to the terminal by using one bit of information. In one embodiment, in a case of an initial access terminal, the signaling may be transmitted to the terminal prior to transmitting a random access, and a channel such as a PBCH or a PDSCH including the signaling information as system information may be used.

In some embodiments, when the resource overlapping scheme is used, an nPDSCH transmission may be discontinued before all of the nPDSCH data are transmitted on the scheduled resource region for the nPDSCH. That is, the base station may discontinue the remaining transmission for the nPDSCH even if there are still data to be transmitted for the nPDSCH scheduled by the base station. This scheme may be used when the base station determines that further transmission is not helpful for the terminal to receive the nPDSCH or wishes to transmit an sPDSCH on the remaining resource region of the scheduled nPDSCH. In this case, the base station may inform, by a signaling, the terminal to which the PDSCH is scheduled that the nPDSCH transmission is to be discontinued. In one embodiment, a physical layer signaling may be used to quickly inform that the nPDSCH transmission is discontinued while the nPDSCH is being transmitted. The physical layer signaling may use, for example, an sPDCCH.

In some embodiments, a semi-persistent scheduling may be applied to each of the nPDSCH and sPDSCH. In a case where the resource overlapping scheme is used, a resource change by the sPDSCH may be allowed to occur in the semi-persistently scheduled nPDSCH resource. Alternatively, the resource change may be not allowed to occur in the semi-persistently scheduled nPDSCH resources.

In one embodiment, if there is a semi-persistently scheduled sPDSCH resource within an nTTI interval in which an nPDSCH is to be scheduled, the nPDSCH may be scheduled in the remaining region other than the semi-persistently scheduled sPDSCH resource.

In some embodiments, the terminal may receive both the regularly scheduled nPDSCH and the semi-persistently scheduled nPDSCH within the same nTTI interval. In another embodiment, the terminal may be predefined to receive only one of the regularly scheduled nPDSCH and the semi-persistently scheduled nPDSCH within the same nTTI interval. For example, the terminal may be predefined to receive only the regularly scheduled nPDSCH among the regularly scheduled nPDSCH and semi-persistently scheduled nPDSCH within the same nTTI interval.

In some embodiments, the terminal may receive both the regularly scheduled sPDSCH and the semi-persistently scheduled sPDSCH within the same sTTI interval. In another embodiment, the terminal may be predefined to receive only one of the regularly scheduled sPDSCH and the semi-persistently scheduled sPDSCH within the same sTTI interval. For example, the terminal may be predefined to receive only the regularly scheduled sPDSCH among the regularly scheduled sPDSCH and semi-persistently scheduled sPDSCH within the same sTTI interval.

While the nTTI and the sTTI have been described based on the downlink physical data channel in embodiments of the present invention, embodiments of the present invention may be applied to an uplink physical data channel in the same or similar manner.

A physical control channel used in a scheduling method according to an embodiment of the present invention is described with reference to FIG. 29 to FIG. 36.

An nPDCCH is a channel for transmitting control information necessary for a terminal to receive an nTTI-based transmission, and may occupy a wide band in a frequency axis like a PDCCH of the LTE system. For example, a nPDCCH resource region may be composed of one or more OFDM symbols and an entire system bandwidth thereof. An OFDM symbol to which the nPDCCH is mapped may be located at an earlier position in time within the nTTI interval. In one embodiment, the nPDCCH may be mapped to an earliest (beginning) OFDM symbol within the nTTI interval. In another embodiment, a reference signal may be mapped to the earliest OFDM symbol within the nTTI interval, and then the nPDCCH may be mapped to the second earliest OFDM symbol. In yet another embodiment, the nPDCCH and the reference signal may coexist on the earliest OFDM symbol within the nTTI interval. In this case, the reference signal may be a reference signal necessary for the terminal to decode the nPDCCH.

When the nPDSCH and the sPDSCH coexist within a carrier, both the nPDCCH and the sPDCCH may be defined within one carrier. A method of defining an sPDCCH resource region is described.

First, an embodiment in which an sPDCCH resource region and an PDSCH resource region are separately defined is described with reference to FIG. 29 and FIG. 30.

Figure 29:
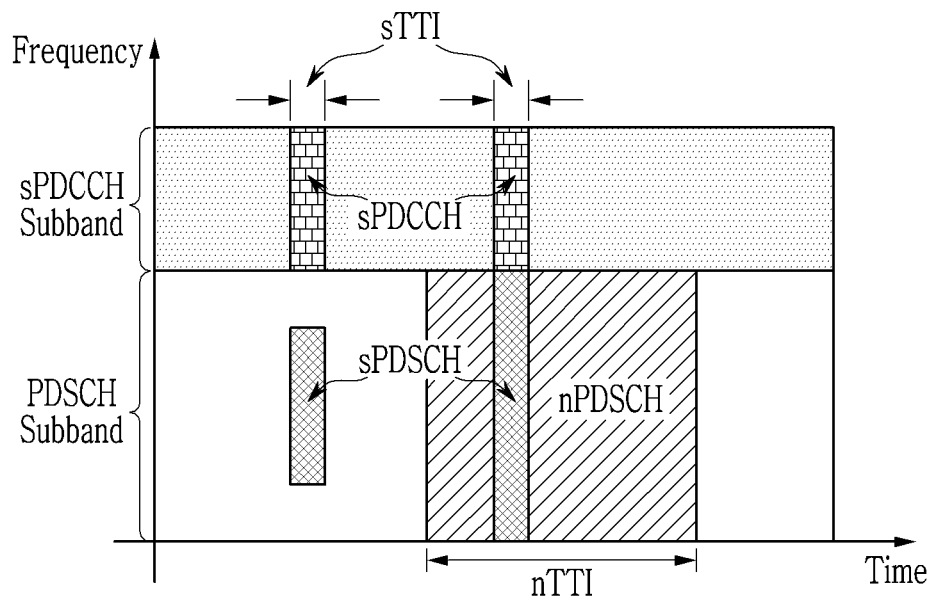
FIG. 29 and FIG. 30 each show an FDM scheme for coexistence of an nPDCCH and an sPDCCH in a scheduling method according to an embodiment of the present invention.
Figure 30:
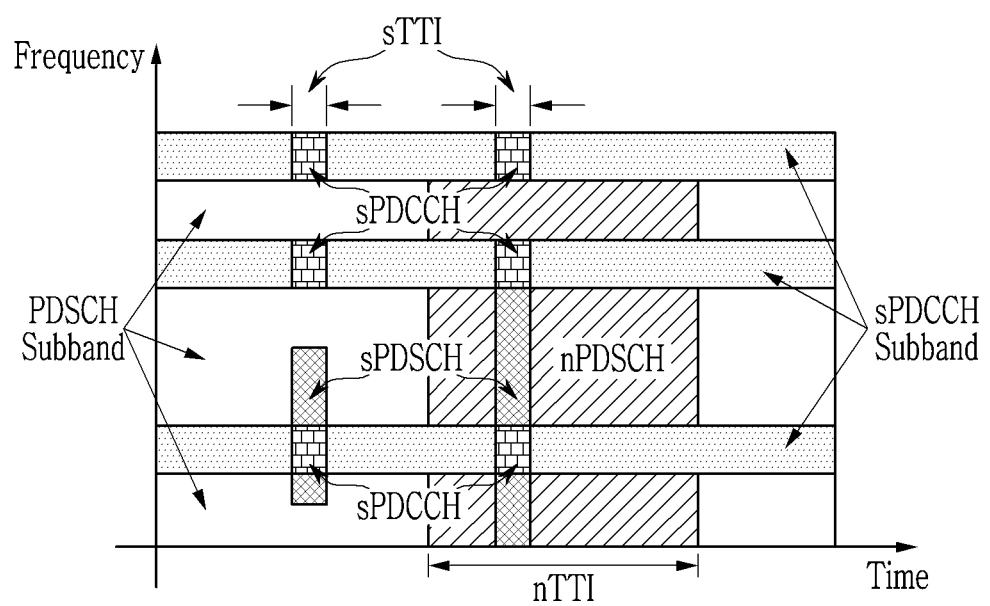

FIG. 29 and FIG. 30 each show an FDM scheme for coexistence of an nPDCCH and an sPDCCH in a scheduling method according to an embodiment of the present invention.

Referring to FIG. 29 and FIG. 30, in some embodiments, an sPDCCH resource region may coexist with an PDSCH resource region in FDM. That is, the sPDCCH resource region may be set to a frequency resource different from the sPDSCH or nPDSCH resource region. In one embodiment, the sPDCCH may be set to continuous frequency resources as shown in FIG. 29. In another embodiment, the sPDCCH may be set to discontinuous frequency resources as shown in FIG. 30. If the sPDCCH is set to the discontinuous frequency resources, a frequency diversity gain for the sPDCCH transmission can be obtained.

In some embodiments, the sPDCCH resource region may be used for only the sPDCCH transmission. That is, if the base station does not schedule the sPDCCH in a certain sTTI, the base station may not transmit any signal in that sTTI. In this case, even if the terminal does not receive the sPDCCH, the terminal can determine whether the sPDCCH is transmitted by sensing energy of a signal received in the sPDCCH resource region. Therefore, if it is sufficient to know whether the sPDCCH is transmitted in each sTTI without needing to know control information transmitted through the sPDCCH, the reception complexity of the terminal can be lowered.

In some embodiments, the sPDCCH resource region may be set to the terminal by the base station. In one embodiment, the sPDCCH resource region may be set in units of subband as shown in FIG. 29. In another embodiment, the sPDCCH resource region may be set in units of resource block as shown in FIG. 30. Here, the subband means a set of consecutive resource blocks, and the resource block means a set of consecutive subcarriers in the frequency axis.

Next, an embodiment of defining an sPDCCH resource region in the PDSCH resource region is described with reference to FIG. 31 and FIG. 32.

Figure 31:
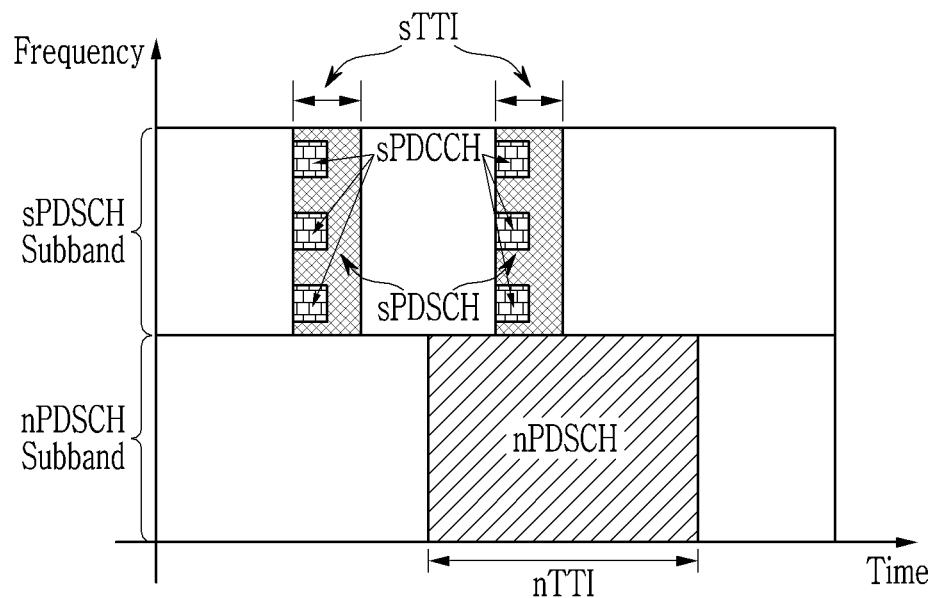
FIG. 31 and FIG. 32 each show a resource overlapping scheme for coexistence of an sPDCCH and an PDSCH in a scheduling method according to an embodiment of the present invention.
Figure 32:
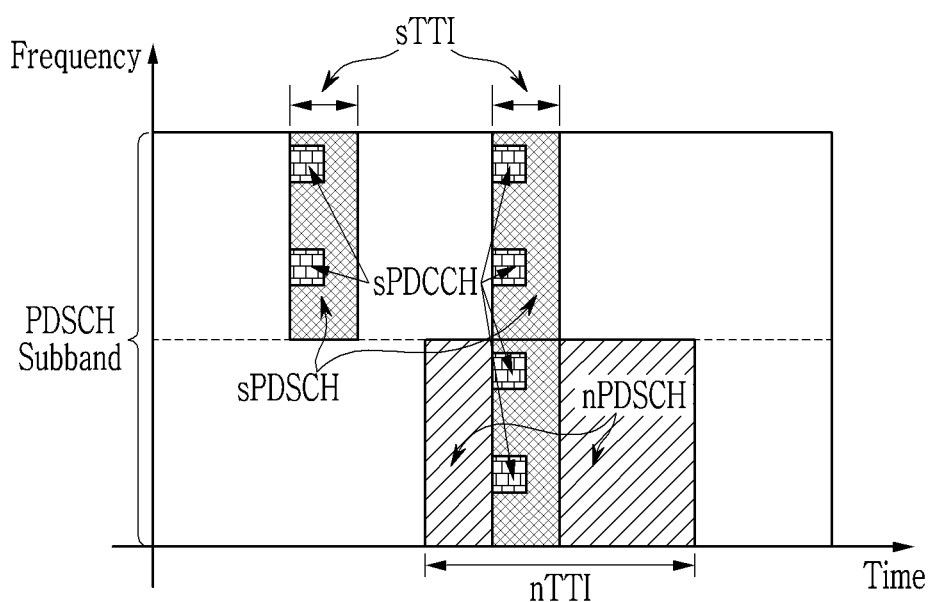

FIG. 31 and FIG. 32 each show a resource overlapping scheme for coexistence of an sPDCCH and an PDSCH in a scheduling method according to an embodiment of the present invention.

Referring to FIG. 31 and FIG. 32, in some embodiments, an sPDCCH resource may be defined at a particular location within a PDSCH resource region, i.e., an sPDSCH or nPDSCH subband. In one embodiment, as shown in FIG. 31, the sPDCCH resources may be defined only within the sPDSCH subband. This method may be suitable for a case where the sPDSCH resource region and the nPDSCH resource region are distinguished by an FDM scheme as described with reference to FIG. 2 to FIG. 4. In another embodiment, as shown in FIG. 32, the sPDCCH resources may be defined within the subbands for the sPDSCH and nPDSCH. This method may be suitable for a case where the sPDSCH and the nPDSCH share the same frequency resource region as described with reference to FIG. 5 to FIG. 8.

In some embodiments, when frequency axis positions of the sPDCCH resource are arranged as wide as possible when the sPDCCH resource is defined in the PDSCH resource region, the higher frequency diversity gain higher than a case where the sPDCCH resource region and the PDSCH resource region are distinguished by the FDM scheme can be ensured.

When the sPDCCH resource is defined in the PDSCH resource region, a resource region to which an sPDSCH scheduled through an sPDCCH is mapped may be implicitly signaled to the terminal through a resource location at which that sPDCCH is transmitted. In this case, a size of control information for sPDSCH resource allocation may be decreased, but the number of times the terminal performs blind decoding on the sPDCCH may be increased.

In some embodiments, if the sPDCCH is not transmitted on a resource region defined as the sPDCCH transmission resource, no signal may be transmitted on the sPDCCH resource in the corresponding sTTI interval. In another embodiment, if the sPDCCH is not transmitted on the sPDCCH resource, the sPDCCH resource may be used for transmission of other physical signals or channels. For example, if sPDSCH is not transmitted in an sTTI in which the sPDSCH is not scheduled, the nPDSCH may be transmitted on the resource region that is defined as the sPDCCH transmission resource. Then, when there is no sPDCCH transmission, the resource utilization efficiency may be increased by using the sPDCCH resource for the other purposes, but it may be difficult for the terminal to determine, by the energy sensing, whether the sPDCCH is transmitted.

Next, a coexisting method of an sPDCCH and an nPDCCH is described with reference to FIG. 33 to FIG. 35.

FIG. 33, FIG. 34, FIG. 35, and FIG. 36 each show a coexisting scheme of an sPDCCH and an nPDCCH in a scheduling method according to an embodiment of the present invention.

Figure 33:
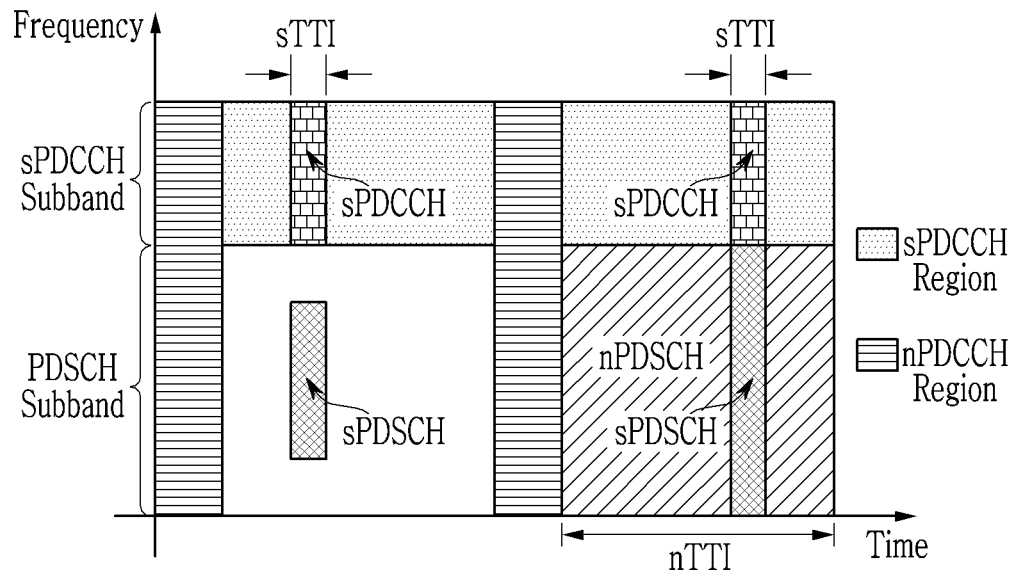
FIG. 33, FIG. 34, FIG. 35, and FIG. 36 each show a coexisting scheme of an sPDCCH and an nPDCCH in a scheduling method according to an embodiment of the present invention.

Referring to FIG. 33, in one embodiment, an sPDCCH resource region and an nPDCCH resource region may coexist in a form that they do not exist on the same OFDM symbol. That is, the sPDCCH resource region and the nPDCCH resource region may be distinguished by TDM. In this case, as described with reference to FIG. 29 and FIG. 30, sPDCCH resource may be distinguished from the sPDSCH or nPDSCH resource region by the FDM scheme. Alternatively, as described with reference to FIG. 31 and FIG. 32, the sPDCCH resource may be defined within the sPDSCH or nPDSCH resource region.

Figure 34:
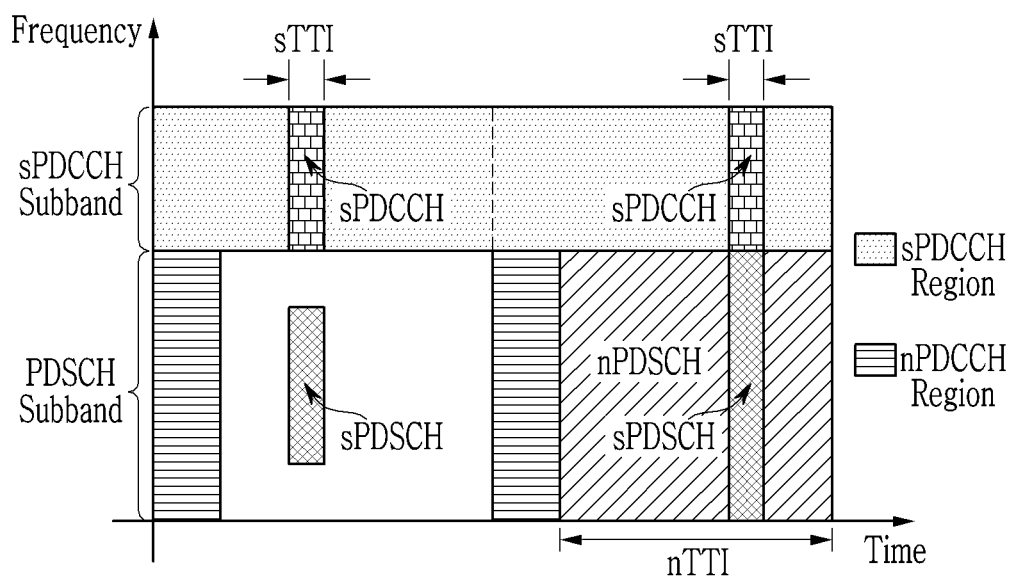
Figure 35:
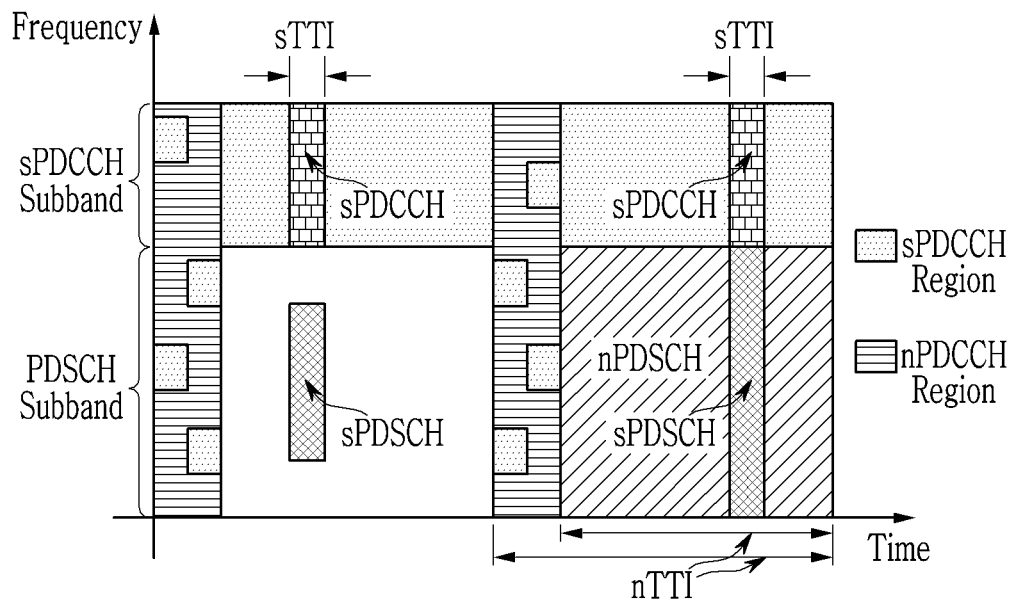

Referring to FIG. 34 and FIG. 35, in another embodiment, an OFDM symbol including both the sPDCCH resource region and the nPDCCH resource region may exist. In this case, the sPDCCH may be transmitted on both an OFDM symbol including the nPDCCH, i.e., a normal control channel interval and an OFDM symbol including no nPDCCH, i.e., an sTTI.

In an embodiment, as shown in FIG. 34, an sPDCCH resource region on an OFDM symbol in which the sPDCCH and the nPDCCH coexist may be defined in the same way as an sPDCCH resource region on an OFDM symbol in which the nPDCCH does not exist. For example, the sPDCCH resource region may be distinguished from the PDSCH resource region by the FDM scheme as described with reference to FIG. 29 and FIG. 30, and may be distinguished from the nPDCCH resource region in the same manner. In one embodiment, the sPDCCH in the normal control channel interval may be designed in the same way as the sPDCCH of each sTTI.

In some embodiments, as shown in FIG. 35, the sPDCCH resource region on the OFDM symbol in which the sPDCCH and the nPDCCH coexist may be defined differently from the sPDCCH resource region on the OFDM symbol in which the nPDCCH does not exist. For example, the sPDCCH resource region may be distinguished from the PDSCH resource region by the FDM scheme as described with reference to FIG. 29 and FIG. 30, and may be distinguished from the nPDCCH in the different way.

In one embodiment, the nPDCCH resource region may include a plurality of resource blocks. Since it is important to obtain the frequency diversity gain in the case of nPDCCH transmission, a resource block for the nPDCCH may be configured by a time-frequency resource different from the resource block for the nPDSCH or the sPDSCH. An example of the resource block for the nPDCCH may include a control channel element (CCE) that is a basic unit of PDCCH resource allocation in the LTE. In this case, the sPDCCH resource region may be configured by using a resource block for the nPDCCH as a basic unit. For example, a plurality of resource blocks for the nPDCCH may be defined over the entire system bandwidth, and a part of the plurality of resource blocks may be defined as the sPDCCH resource region as shown in FIG. 35. The resource block configuring the sPDCCH resource region may be defined to be always fixed or to be changed with time.

For the LTE systems, one or more CCEs may be defined as the sPDCCH resource region. Since a size of control information transmitted through the sPDCCH may be smaller than a size of a DCI transmitted through the PDCCH, the number of CCEs used to transmit one sPDCCH may be equal to or less than that (e.g., 4 or 8) of the PDCCH. The CCE used as the sPDCCH resource region may be distinguished from a CCE defined as a cell-specific search space (CSS). For example, the sPDCCH resource region may be defined as a CCE with an index immediately following the CCE defined as the cell specific search space. The CCE used as the sPDCCH resource region may overlap with a CCE defined as a UE-specific Search Space (USS). In some embodiments, the CCE may be generally interpreted as a resource block for a control channel.

As such, the sPDCCH resource region may coexist with the nPDCCH resource. Further, since the sPDCCH resource region may be set over the entire system bandwidth, the frequency diversity gain can be obtained at transmitting the sPDCCH.

Figure 36:
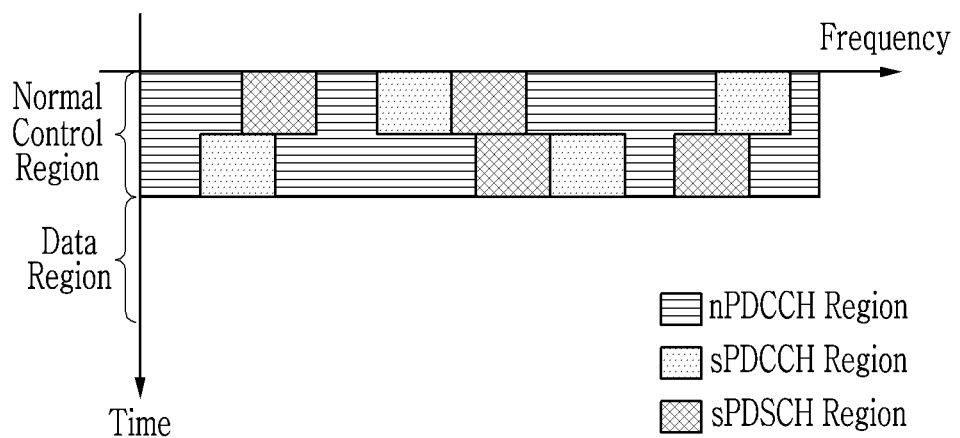

According to embodiments described with reference to FIG. 33 to FIG. 35, the sPDSCH can be transmitted in the normal control channel interval. For this, in some embodiments, the base station may schedule the sPDSCH on an OFDM symbol on which the sPDCCH and nPDCCH are transmitted, as shown in FIG. 36. Then, it can be helpful for minimizing the user plane latency for the URLLC since the base station has the opportunity to schedule the sPDSCH in the normal control channel interval as well as the sTTI. The sPDSCH resource region in the normal control channel interval may be configured as a part of the resource block designed for the nPDCCH as in the case of the sPDCCH resource region described above. The sPDSCH resource region may be distinguished from the nPDCCH resource region or the sPDCCH resource region. For example, the sPDSCH resource region may be distinguished from a cell-specific nPDCCH resource region and may overlap with a terminal-specific nPDCCH resource region.

In one embodiment, the sPDSCH in the normal control channel interval may be scheduled through the sPDCCH in the normal control channel interval. When a length of the normal control channel interval in the time axis is longer than the sTTI length, a plurality of sTTIs may be defined within the normal control channel interval. In this case, scheduling information of an sPDSCH scheduled in each sTTI within the normal control channel interval may be transmitted through an sPDCCH in the same sTTI.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An operation method performed by a base station in a communication system, the operation method comprising:
   determining a shift value of a subcarrier position for an uplink transmission;
   generating information which indicates a frequency shift of subcarrier(s) for the uplink transmission based on the shift value; and
   transmitting, to a user equipment (UE), the information,
   wherein the frequency shift is applied to all of the subcarrier(s) for the uplink transmission.

2. The operation method of claim 1, wherein the information is transmitted through a physical downlink shared channel (PDSCH).

3. The operation method of claim 1, wherein the information is included in a higher layer message which is transmitted from the base station to the UE.

4. The operation method of claim 1, wherein the shift value is a half of a subcarrier spacing which is applied to a carrier in which the uplink transmission is performed.

5. The operation method of claim 4, wherein the subcarrier spacing is 15 kHz.

6. The operation method of claim 1, wherein the shift value is 7.5 kHz.

7. The operation method of claim 1, wherein, when the communication system is a new radio (NR) system, the shift value is an offset between a channel raster of the NR system and a channel raster of a long term evolution (LTE) system.

8. An operation method performed by a user equipment (UE) in a communication system, the operation method comprising:
   receiving, from a base station, information which indicates a frequency shift of subcarrier(s) for an uplink transmission;
   determining frequency locations of the subcarrier(s) used for the uplink transmission based on a shift value; and
   performing the uplink transmission in the determined frequency locations,
   wherein the frequency shift is applied to all of the subcarrier(s) for the uplink transmission.

9. The operation method of claim 8, wherein the information is included in a system information message which is broadcasted from the base station before performing a random access procedure between the UE and the base station.

10. The operation method of claim 8, wherein the information is received through a physical downlink shared channel (PDSCH).

11. The operation method of claim 8, wherein the information is included in a higher layer message which is transmitted from the base station to the UE.

12. The operation method of claim 8, wherein the shift value is a half of a subcarrier spacing which is applied to a carrier in which the uplink transmission is performed.

13. The operation method of claim 12, wherein the subcarrier spacing is 15 kHz.

14. The operation method of claim 8, wherein the shift value is 7.5 kHz.

15. The operation method of claim 8, wherein, when the communication system is a new radio (NR) system, the shift value is an offset between a channel raster of the NR system and a channel raster of a long term evolution (LTE) system.

* * * * *